United States Patent [19]

Day, Jr. et al.

[11] Patent Number: 5,043,980

[45] Date of Patent: Aug. 27, 1991

[54] SWITCHING CELL FOR PACKET SWITCHING NETWORK

[75] Inventors: Chester M. Day, Jr., Randolph; James N. Giacopelli, Flanders, both of N.J.

[73] Assignee: Bell Communications Research, Inc., Livingston, N.J.

[21] Appl. No.: 432,921

[22] Filed: Nov. 7, 1989

Related U.S. Application Data

[62] Division of Ser. No. 167,790, Mar. 14, 1988, Pat. No. 4,910,730.

[51] Int. Cl.$^5$ ............................................. H04Q 11/04
[52] U.S. Cl. ..................................................... 370/60
[58] Field of Search ....................... 370/60, 60.1, 94.1, 370/94.2, 94.3

[56] References Cited

U.S. PATENT DOCUMENTS

| | | | |
|---|---|---|---|
| 3,428,946 | 2/1969 | Batcher | 370/60 |
| 4,542,497 | 9/1985 | Huang et al. | 370/60 |
| 4,893,304 | 1/1990 | Giacoppelli et al. | 370/94.1 |

Primary Examiner—Douglas W. Olms
Assistant Examiner—Wellington Chin
Attorney, Agent, or Firm—James W. Falk

[57] ABSTRACT

A cell for use in a packet switching network. The cell comprises an input for receiving a packet including a destination address and first and second outputs. The cell includes a selection circuit for connecting the input with the first output or the second output depending on whether a specific bit occupying a predetermined position in the packet address is a logic "1" or a logic "0". Illustratively, the specific bit is the first bit after a start bit of the packer and each of the cells includes means for rotating the specific bit to the end of the address. This is especially useful for implementing a banyan network wherein the $k^{th}$ column of cells the routing decision is based on the $k^{th}$ most significant bit of the address. as the address bit rotation mechanism can be used to ensure that the first bit after the start bit of a packet is the $k^{th}$ most significant address bit. Preferably, each of the cells may be disabled in response to a disabling signal so that the input is connected to the first or second output independently of the logic value of the specific bit. This permits a packet switching network to be formed from interconnected horizontal and vertical stacks of chips. wherein selected cells are disabled.

9 Claims, 28 Drawing Sheets

BATCHER CELL

BANYAN CELL

8 X 8 CHIP DESIGN

BANYAN

8 X 8 CHIP DESIGN

BATCHER

8 X 8 SORT BUILDING BLOCK

8 X 8 MERGE BUILDING BLOCK

4 X 4 MERGE BUILDING

2 X 2

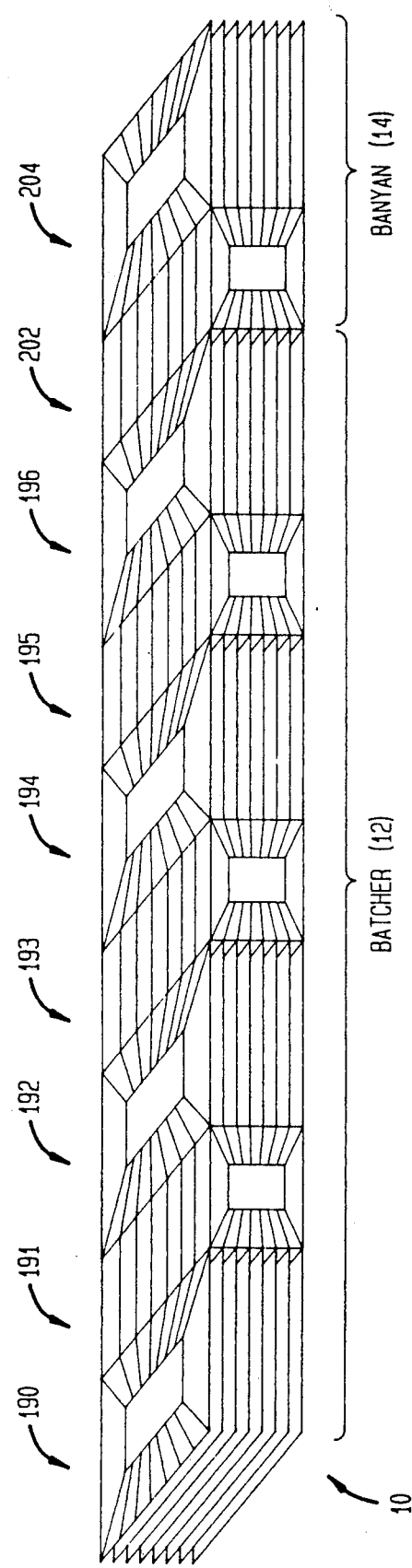

SWITCHING CELL FOR PACKET SWITCHING NETWORK

RELATED APPLICATION

This is a division of U.S. patent application, Ser. No. 167,790 filed on Mar. 14, 1988, U.S. Pat. No. 4,910,730, for Chester M. Day and James N. Giacopelli and assigned to the assignee hereof.

FIELD OF THE INVENTION

The present invention relates to a switching cell for use in a packet switching network such as a banyan network.

BACKGROUND OF THE INVENTION

The Batcher-banyan network is a self-routing network which is capable of synchronously routing packets of data in time slots from a set of input terminals to a set of output terminals without centralized control. The routing through the network is determined by an address contained in the header of each packet.

The Batcher-banyan network comprises a Batcher sorting network, followed by a banyan routing network. The function of the Batcher sorting network is to arrange incoming packets in ascending or descending order according to their destination addresses. The function of the banyan network is to route the presorted packets to their destination output terminals.

The banyan network can route a data packet from any input terminal to any destination terminal, but may suffer from internal packet congestion, in the sense that two or more packets may be routed through the same internal link at the same time. However, the banyan network is internally non-blocking if in a particular time slot no more than one incoming packet is addressed to each banyan output and the packets are arranged in ascending or descending order when they arrive at the banyan inputs. Therefore it is possible to construct a non-blocking network by combining a Batcher sorting network and a banyan routing network. An example of a switching system in which a non-blocking selfrouting Batcher-banyan network is utilized can be found in U.S. Pat. No. 4,782,478. The above-identified patent is incorporated herein by reference.

The Batcher-banyan network may be built from small switching cells. By using VLSI technology many of these cells may be implemented in a single VLSI chip. Many applications require the Batcher-banyan network to operate at very high speeds such as 100 megabits/sec. It is often the case that signal propagation delays in the electrical connections between individual chips comprising a network such as the Batcher-banyan network contribute more to processing delays than signal propagation delays within individual IC chips.

It has previously been suggested that "between chip signal propagation delays" in complex networks can be reduced by forming the network from chips arranged in adjoining horizontal and vertical stacks (see, e.g., Donald K. Wilson, "Topological Aspects of Systems Partitioning," pp. 148-154, Vol. 3 "Design Theory and Practice", Proceedings of the International Conference on Design Policy, July 1982).

In view of the above, it is an object of the present invention to provide a switching cell for a packet switching network such as a banyan network, which switching cell enables a packet switching network to be implemented in three dimensions by interconnected horizontal and vertical stacks of chips.

SUMMARY OF THE INVENTION

The present invention is a cell for use in a packet switching network. The cell comprises an input for receiving a packet including a destination address and first and second outputs. The cell includes a selection circuit for connecting the input with the first output or the second output depending on whether a specific bit occupying a predetermined position in the packet address is a logic "1" or a logic "0".

Illustratively, the specific bit is the first bit after a start bit of the packet and each of the cells includes means for rotating the specific bit to the end of the address. This is especially useful for implementing a banyan network wherein in the $k^{th}$ column of cells the routing decision is based on the $k^{th}$ most significant bit of the address, as the address bit rotation mechanism can be used to insure that the first bit after the start bit of a packet is the $k^{th}$ most significant address bit. Preferably, each of the cells may be disabled in response to a disabling signal so that the input is connected to the first or second output independently of the logic value of the specific bit. This permits a packet switching network to be formed from interconnected horizontal and vertical stacks of chips wherein selected cells are disabled.

BRIEF DESCRIPTION OF THE DRAWINGS

FIG. 2b depicts pulses applied to the cell of FIG. 2a.

FIGS. 6-24 show how the entire Batcher-banyan network of FIG. 1 can be implemented using the chips of FIGS. 4a and 4b.

DETAILED DESCRIPTION OF THE INVENTION

For purposes of clarity, the discussion is divided into the following sub-sections:

A. Overview of the Batcher-banyan Network
B. The Batcher Cell
C. The Banyan Cell
D. Perfect Shuffle and Binary Wiring
E. Use of Perfect Shuffle and Binary Wiring to form the Batcher-Network
F. Wiring Pattern of the Banyan Network
G. Basic Chip Building Blocks Used for Implementation of the Batcher-banyan Network
H. Three Dimensional Implementation of the Batcher-banyan Network Using the Chip Building Blocks I. Detailed Interconnection of Building Block Chips to Form the Batcher-banyan Network in Three Dimensions II. Conclusion

A. OVERVIEW OF A BATCHER-BANYAN NETWORK

Before discussing in detail the two chip designs used to form a Batcher-banyan network, it may be helpful to briefly review the structure of a Batcher-banyan network.

Figure 1:
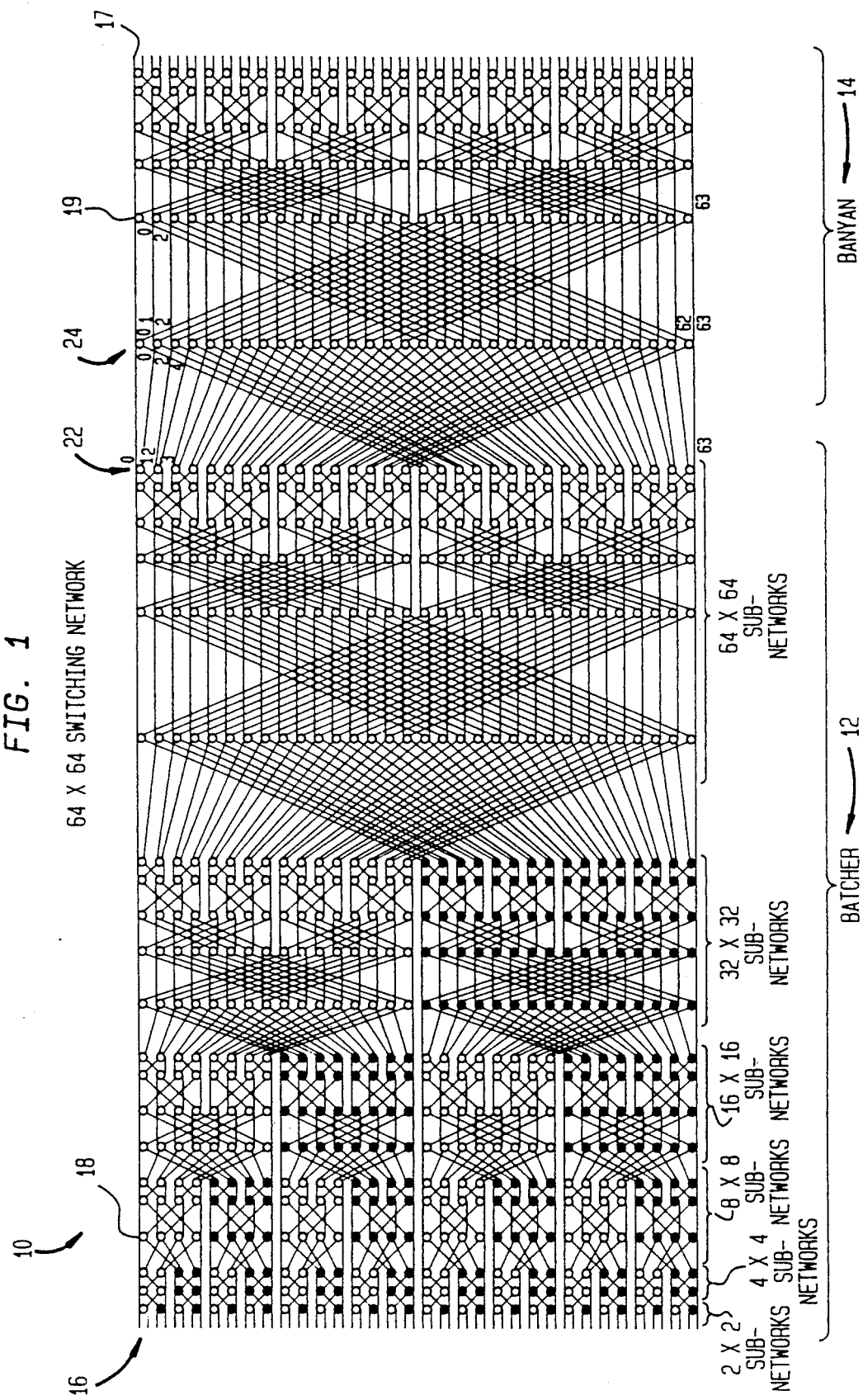
FIG. 1 schematically illustrates a 64×64 Batcher-banyan network which can be implemented using only two distinct integrated circuit designs.

FIG. 1 shows a Batcher-banyan network 10 having 64 inputs 16 and and 64 outputs 17. The Batcher-banyan network 10 comprises a Batcher network 12 and a banyan network 14. As indicated above, the Batcher network sorts incoming packets according to a destination address contained in the packet header and the banyan network routes these packets to the destination address. The Batcher network is made up of discrete cells 18 and the banyan network is made up of discrete cells 19. As can be seen in FIG. 1, the cells 18 and 19 are arranged in columns. Each Batcher cell 18 has two inputs and two outputs. There are two types of cells 18 in the Batcher network 12 of FIG. 1: black cells (shaded) and white cells (unshaded). The routing of each cell 18 is determined by the destination addresses of the two packets synchronously arriving at the inputs of the cell. The white cells route the packet with the larger destination address to the lower output and the black cells route the packet with the larger destination address to the upper output. If only one packet arrives at a cell, then the packet will be routed as if it had the larger address.

As indicated above, it is an object of the present invention to implement the Batcher-banyan network of FIG. 1 with only two distinct IC chips. As is shown below, this may be accomplished when the Batcher cells 18 are formed using a unique design in which they can be disabled to a pass state.

The discussion which follows includes a detailed description of a unique Batcher cell (FIG. 2) and a discussion of the wiring patterns used to interconnect the cells 18 into the Batcher network 12. A detailed discussion of the banyan cell 19 (FIG. 3) also follows along with a discussion of the wiring pattern used to connect the cells 19 to form the Banyan network 14.

B. THE BATCHER CELL

Figure 2A:
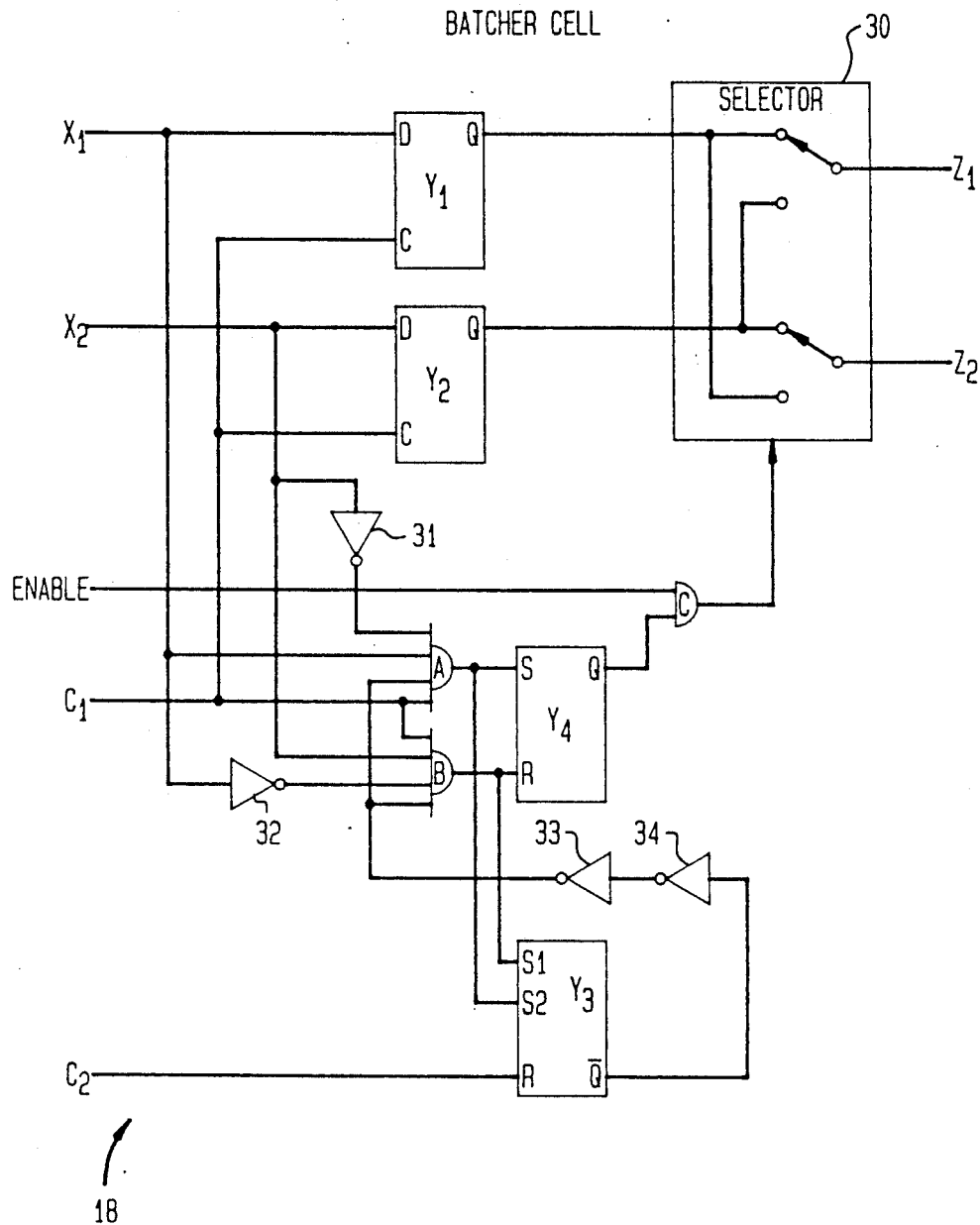
FIG. 2a schematically illustrates a cell of the Batcher network of FIG. 1
Figure 2B:
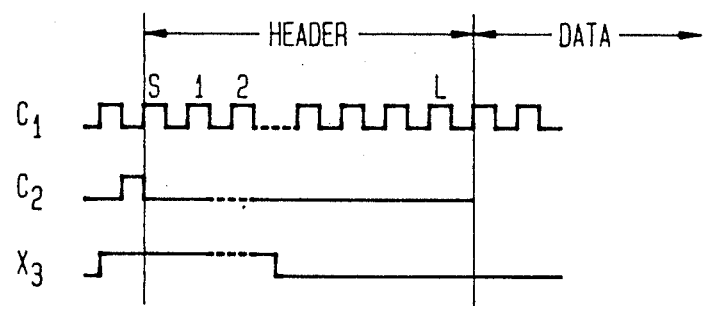

FIG. 2a is a circuit diagram of one of the cells 18 of the Batcher network 12 of FIG. 1. The Batcher cell 18 has the unique design in which it can be disabled to a pass state. As is shown below this enables the Batcher network to be implemented using a single chip design and the entire Batcher-banyan network to be implemented using only two chip designs. The cell 18 of FIG. 2a operates as follows:

The cell 18 processes fixed length packets synchronously under control of clock pulses $C_1$. (See FIG. 2b). Each packet includes a header comprising a start bit followed by the address of a desired output 17 (see FIG. 1) and an optional priority field. After the header comes the data as indicated in FIG. 2b. Two such packets arrive synchronously at the inputs $X_1$ and $X_2$ and are shifted through single stage shift registers $Y_1$ and $Y_2$ to outputs $Z_1$ and $Z_2$ by way of selector 30. The selector 30 is positioned to the "pass" state ($X_1$ to $Z_1$ and $X_2$ to $Z_2$) or the "cross" state ($X_1$ to $Z_2$ and $X_2$ to $Z_1$) so that the packet with the larger address appears at $Z_2$. Thus, the cell 18 of FIG. 2 is a white-type Batcher network cell.

The decision logic controlling the selector 30 comprises gates A, B, and C and flip-flops $Y_3$ and $Y_4$ as well as inverters 31, 32, 33 and 34. The cell 18 of FIG. 2 expects a control signal $C_2$ which is high during the last part of the clock period of clock signal $C_1$ preceding the start bit S of the packet as shown in FIG. 2b. $C_2$ resets flip-flop $Y_3$ which enables gates A and B. Then clock $C_1$ samples the input packets on $X_1$ and $X_2$ until a difference is detected. $X_1$ high and $X_2$ low means the address of the packet on $X_1$ is larger, and gate A set flip-flop $Y_4$ positioning the selector to the "cross" state. $X_1$ low and $X_2$ high means the opposite and gate B resets $Y_4$ positioning the selector to the "pass" state. Either position means a difference was detected and $Y_3$ is set, disabling gates A and B. $Y_4$ is held in its state by $Y_3$ until the next $C_2$ signal initiates a new cycle. The selector remains in the same position into the next pair of packets on inputs $X_1$ and $X_2$ until a difference is detected. Its position doesn't matter as long as bits of the new packets match. Proper operation of Batcher-banyan network 10 of FIG. 1 requires that certain control signals ($C_2$ is an example) progress from one column of cells 18 to the next in proper time relation to the headers of the packets which are also progressing from one column of cells 18 to the next in the Batcher-banyan network 10 of FIG. 1. This is accomplished as follows. The control signal $X_3$ is supplied to the Batcher-banyan network 10 together with the packets. A shift register (not shown) located at the bottom of the Batcher-banyan network 10 (see FIG. 1) provides clock pulses $X_3$ column by column through the network synchronously with the packet. As shown in FIG. 2b, $X_3$ is a signal which is high one clock time before the start bit of the packets and lasts one bit time less than the length of the address field of a packet (two bit times less than the length of the header start bit plus binary address). As is discussed in detail below, the Batcher network 12 is built up from a plurality of IC chips. Each chip comprises a plurality of cells 18. The control signal $X_3$ exits each chip and enters a near neighbor chip providing synchronization timing for that chip. Each chip derives its internal control signals for each internal column of cells from $X_3$ and clock $C_1$.

One particular feature of the cell 18 of FIG. 2 is that the cell may be selectively disabled through the use of the ENABLE control lead. ENABLE low to gate C forces the selector to the "pass" state. As is discussed below the use of a Batcher cell 18 that can be selectively disabled allows the entire Batcher network 12 of FIG. 1 to be formed from one IC chip design and the entire Batcher-banyan network 10 of FIG. 1 to be formed from two IC chip designs.

A plurality of cells 18 (see FIG. 2) can be arranged as shown in FIG. 1 to form a 64×64 Batcher network 12. To interconnect the cells 18, two basic wiring patterns are utilized. These are "perfect shuffle" wiring and "binary" wiring. These wiring patterns are also used to form the banyan network 14 of FIG. 1 and are discussed below in section D.

C. THE BANYAN CELL

The banyan network 14 of FIG. 1 is also made up of many switching cells 19, where each cell 19 receives packets from either or both of two inputs. Based on the destination address of the packet, each banyan cell selects one of its outputs to which each packet is routed. In the $k^{th}$ stage (i.e. $k^{th}$ column) of the banyan network the routing is determined by the $k^{th}$ bit in the destination address of each incoming packet.

Figure 3A:
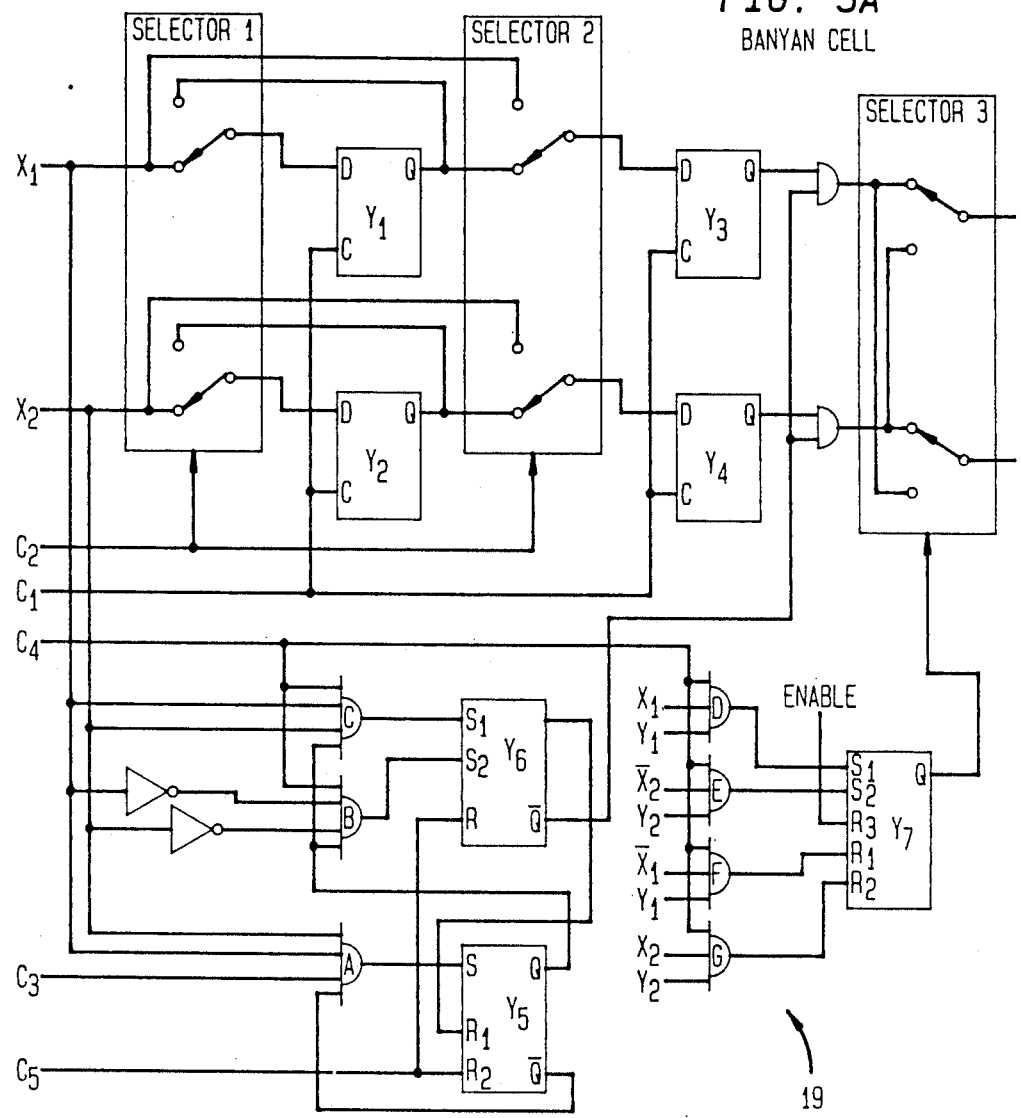
FIG. 3a schematically illustrates a cell of the banyan network of FIG. 1
Figure 3B:
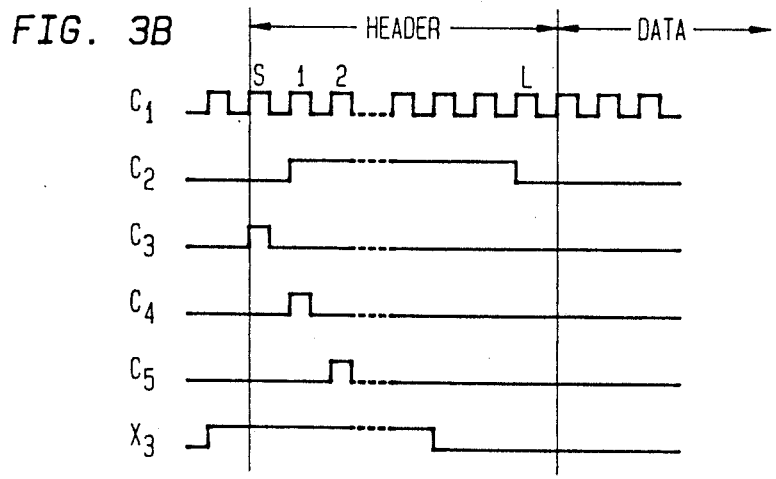
FIG. 3b depicts certain pulses applied to the cell of FIG. 3a, in accordance with an illustrative embodiment of the present invention.

FIG. 3 schematically illustrates an individual banyan cell 19. Illustratively, the banyan cell 19 of FIG. 3a examines the $k^{th}$ bit of the addresses which follow the start bits S1 and S2 of the packets received on the two inputs $X_1$ and $X_2$. For start bit S1, address bit $k_1$, start bit S2, address bit $k_2$ of packets received at the inputs $X_1$ and $X_2$ and using "dc" for "don't care", the state of the selector 3 of FIG. 3 is given by the following truth table.

| SB1 | k1 | SB2 | k2 | Selector 3 |
| --- | --- | --- | --- | --- |
| 0 | dc | 0 | dc | dc |
| 0 | dc | 1 | 0 | cross |
| 0 | dc | 1 | 1 | pass |
| 1 | 0 | 0 | dc | pass |
| 1 | 1 | 0 | dc | cross |
| 1 | 0 | 1 | 0 | kill both SBs |
| 1 | 0 | 1 | 1 | pass |
| 1 | 1 | 1 | 0 | cross |
| 1 | 1 | 1 | 1 | kill both Sbs |

When the selector 3 of the cell 19 of FIG. 3 is in the pass state the input $X_1$ is connected to the output $Z_1$, and the input $X_2$ is connected to the output $Z_2$. When the selector 3 is in the cross-state input $X_1$ is connected to output $Z_2$ and input $X_2$ is connected to input $Z_1$.

The banyan cell has two bits of delay. The delay for the packet arriving on input $X_1$ is provided by flipflops $Y_1$ and $Y_3$. The delay for packets arriving on input $X_2$ is provided by flipflops $Y_2$ and $Y_4$. Selectors 1 and 2 provide the capability to remove the bit after the start bit, close up the packet, and insert the bit back into the packet later at a time determined external to the cell by the length of the control signal $X_3$ (See FIG. 3b). The control signal $X_3$ has been discussed above. In the simplest case the removed bit is returned at the end of the address field. This rotates the address so that the $(k+1)^{th}$ address bit is positioned behind the start bit for the $(k+1)^{th}$ column of cells in the banyan network. (Recall the cells in the $k^{th}$ column of the banyan network make their routing decision based on the $k^{th}$ most significant bits of the packet addresses.) By returning the bit, parity is preserved in the packet, a feature important for maintenance of the switch. Thus, if the address has n bits and banyan network has n columns, the address of a packet is rotated n bits so that the packet leaves the switch with its address bits returned to their positions at entry.

In FIG. 3a, assume the cell 19 is set up in the pass state. Selectors 1 and 2 are shown in the right positions for that situation. The packet of input $X_1$ passes through shift register stages or flipflops $Y_1$ and $Y_3$ to selector 3; the packet of input $X_2$ through shift register stages or flipflops $Y_2$ and $Y_4$. Selector 3 is controlled by flip-flop $Y_7$ whose state has been established by the ENABLE lead or gates D, E, F, and G. The selector is in the pass state when $Y_7$ is reset.

Flipflops $Y_5$ and $Y_6$ and gates A, B, and C force the start bits (S1 and S2) of the packets on the inputs $X_1$ and $X_2$ to be low if both packets are active (start bits highs) and the $X_1$ and $X_2$ address bits are for the same output $Z_1$ or $Z_2$. Because of the Batcher sorting network 12 which precedes the banyan network 14 (see FIG. 1) this condition will occur only if there is a circuit fault. Inactivating the packets prevents the error condition from propagating further.

Assume flip-flop $Y_5$ and $Y_6$ are reset. Control signal $C_3$ high establishes the start of new packets. Clock $C_1$ shifts start bits on $X_1$ and $X_2$ into $Y_1$ and $Y_2$. If both start bits are high, $C_3$ sets $Y_5$ through gate A enabling gates B and C. The next cycle of clock $C_1$ shifts the start bits to $Y_3$ and $Y_4$ and the $X_1$ and $X_2$ routing bits to $Y_1$ and $Y_2$. $C_4$ samples $X_1$, $X_2$, $Y_1$, and $Y_2$. Through gates D, E, F, and G, $C_4$ establishes the state of $Y_7$ to set selector 3 to pass or cross. Through gates B and C, $C_4$ sets $Y_6$ if both routing bits $X_1$ and $X_2$ are the same to force both start bits low. To avoid logical hazards, $C_4$ must be high for a time less than the propagation time of the shift register stages. $C_2$ operates selectors 1 and 2 trapping the routing bits in $Y_1$ and $Y_2$ and establishing a by-pass path to $Y_3$ and $Y_4$ for the remaining bits of the header address. $C_5$ high resets $Y_5$ and $Y_6$ terminating insertion of low start bits if that was necessary. Finally, $C_2$ going low allows the trapped routing bits in $Y_1$ and $Y_2$ to advance to $Y_3$ and $Y_4$ on the next cycle of clock $C_1$, reestablishing the normal path through the shift register stages for the rest of the bits in each packet. Note, the lead ENABLE may be used to disable the cell 19 of FIG. 3a by forcing the selector 3 into the pass state.

This completes the discussion of the banyan cell 19. A plurality of the cells 19 may be interconnected to form the 64×64 banyan network of FIG. 1. To interconnect the cells 19, the perfect shuffle and binary wiring patterns may be utilized. These wiring patterns are discussed in section D immediately following.

D. PERFECT SHUFFLE AND BINARY WIRING

An example of perfect shuffle wiring can be seen in FIG. 1 between the Batcher network 12 and the banyan network 14. There are 64 interconnections. Assume also the Batcher outputs 22 are numbered 0 to 63. Assume also the banyan inputs 24 are also numbered 0 to 63. The first half of the Batcher outputs (0-31) are connected to the even numbered banyan inputs: 0,2, . . . , 62. The second half of the Batcher outputs (32-63) are connected to the odd numbered banyan inputs: 1, 3, . . . , 63. This is like a perfect shuffle of the two halves of a deck of playing cards.

An example of binary wiring can be seen between the first two columns (i.e. the two leftmost columns) of cells in the banyan network 14. The outputs of the cells in the first (i.e. left most column of the banyan network may be assumed to be numbered 0 . . . 63. Similarly, the inputs of the cells in the second column of the banyan network may be assumed to be labeled 0 . . . 63. Consider any cell in the first column (i.e. the leftmost column) of the banyan network 14. Its top output is connected to the same numbered input in the top half of the second column, and its bottom output is connected to the input in the same relative position within the bottom half of the second column. For example, outputs of the top cell of the first column of the banyan network, outputs 0 and 1, connect to inputs 0 and 32 of the second column of the banyan network. Similarly, the outputs of the next cell of the first column of banyan network, outputs 2 and 3, connect to inputs 2 and 34 in the second column of the banyan, etc. The wiring for the cells of the bottom half of the first column of the banyan network have mirror image symmetry with respect to a horizontal line passing through the middle of the column. For example, outputs of the bottom cell of the first column of the banyan, outputs 62 and 63, connects to inputs 31 and 63 of the second column of the banyan. Outputs of the next-to-bottom cell of the first column of the banyan, outputs 60 and 61, connects to inputs 29 and 61 of the second column of the banyan.

E. USE OF PERFECT SHUFFLE AND BINARY WIRING TO FORM THE BATCHER NETWORK

In the discussion immediately above, the "perfect shuffle" wiring pattern and the "binary" wiring pattern have been discussed. The interconnection of the cells 18 to form the Batcher network can now be explained as combinations of perfect shuffle and binary interconnection patterns. Consider the leftmost column of cells in the Batcher network 12 of FIG. 1. Each cell in the leftmost column of FIG. 1 sorts two packets (see bottom of FIG. 1). The next two columns of the Batcher network 12 comprises 4×4 subnetworks, which subnetworks can sort four packets (see the bottom of FIG. 1). The next three columns of the Batcher network comprises 8×8 subnetworks, which subnetworks can sort eight packets, etc. (see bottom of FIG. 1). The sorts of two (outputs of the first Batcher column) are merged into the inputs of the 4×4 subnetworks with a perfect shuffle pattern. Within the 4×4 subnetworks (i.e. within the second and third columns of the banyan network), there appears a binary pattern of the leads. The sorts of four (i.e. the outputs of the 4×4 subnetworks) are merged to the inputs of the 8×8 subnetworks with a perfect shuffle pattern. Within the 8×8 subnetworks, the first two columns are interconnected with a binary pattern of eight interconnections. The next two columns are interconnected with a binary pattern of four interconnections, etc. Following the 8×8 subnetworks, are 16×16 subnetworks, 32×32 subnetworks and one 64×64 subnetworks (see the bottom of FIG. 1). The subnetworks are interconnected with the perfect shuffle wiring pattern, however, within each subnetwork, the binary wiring pattern appears. The last merge and sort of the Batcher network (between the 32×32 subnetworks and the 64×64 subnetworks) comprises two groups of 32 leads merged through a perfect shuffle of 64 interconnections into a 64×64 subnetwork of six columns of cells. The interconnections within the 64×64 subnetworks are binary: 64, 32, 16, 8, and 4.

In the Batcher network 12 of FIG. 1, white cells 18 sort to an ascending order toward the bottom of the figure and black cells 18 sort to an ascending order toward the top of the figure. Thus it can be seen in FIG. 1 that, at each merger (i.e. each combination of the outputs of two smaller subnetworks into the inputs of a larger subnetwork) is accomplished with a perfect shuffle, an ascending set is being merged with a descending set. For example, the outputs of the topmost 8×8 subnetwork (white cells) and the outputs of the second 8×8 subnetworks (black cells) are merged into the inputs of the topmost 16×16 subnetworks using a perfect shuffle wiring pattern.

F. WIRING PATTERN OF THE BANYAN NETWORK

Figure 7:
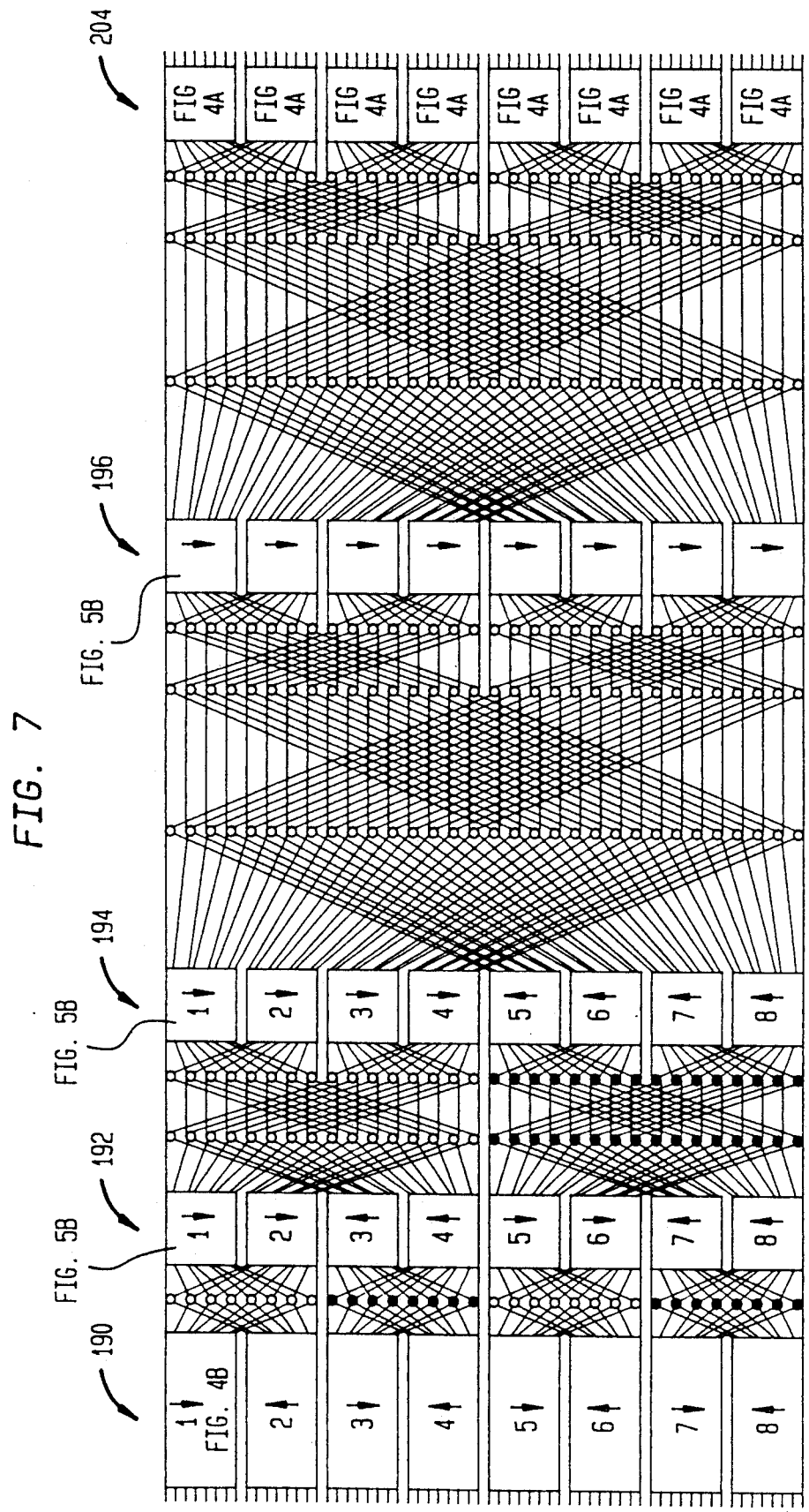

A plurality of cells of the type shown in FIG. 3a are interconnected to form the banyan network 14 of FIG. 7. The 64×64 banyan network 19 of FIG. 1 has 6 columns. The wiring patterns between adjacent columns are binary: 64, 32, 16, 8, and 4. Since the banyan is preceded by a perfect shuffle for 64 interconnections, its input wiring and internal wiring can be sen to be the same as the wiring for the final merge and sort of 64 in the Batcher network 12. In other words the input wiring and internal wiring of the last six columns of the Batcher network 12 is the same as the input wiring and internal wiring of the banyan network (although the banyan network and Batcher network utilize different cell structures).

G. BASIC CHIP BUILDING BLOCKS USED FOR IMPLEMENTATION OF THE BATCHER-BANYAN NETWORK

The Batcher-banyan network is now considered as a whole. For an N×N Batcher-banyan network where $N=2^n$, the number of columns in the Batcher is $$k = \frac{n(n+1)}{2} = \frac{(\log_2 N)(\log_2 N + 1)}{2}.$$

The number of cells/column is $$\frac{N}{2}.$$

The number of cells is $$\frac{N(\log_2 N)(\log_2 N + 1)}{4}.$$

For the banyan the number of columns is $$n = \log_2 N.$$

The number of cells is $N(\log_2 N)$. For the complete Batcher-banyan network the number of columns is $$\frac{n(n+3)}{2} = \frac{(\log_2 N)(\log_2 N + 3)}{2}.$$

The number of cells is $$\frac{N(\log_2 N)(\log_2 N + 3)}{2}.$$

Using FIGS. 4–24, it will be shown that an N×N Batcher-banyan network (such as the network 10 of FIG. 1) can be realized in a three-dimensional configuration with only two $\sqrt{N} \times \sqrt{N}$ VLSI chip designs. The FIGS. 4–24 illustrate the case for N=64, the smallest network demonstrating the properties of the general case.

Figure 4A:
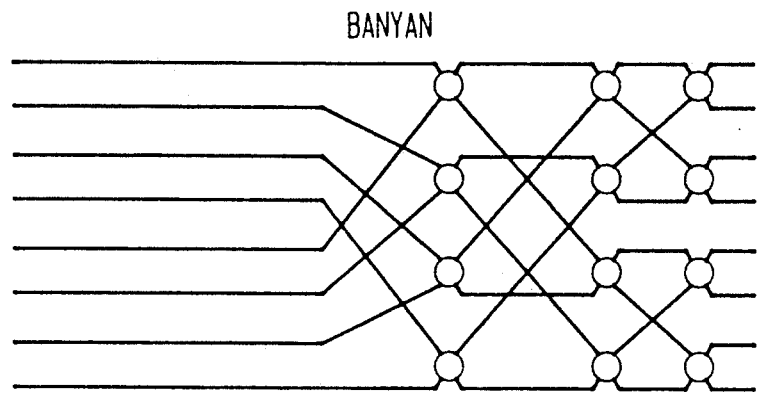
FIGS. 4a and 4b illustrates the two basic building blocks (integrated circuits) used to implement the Batcher-banyan network of FIG. 1.
Figure 4B:
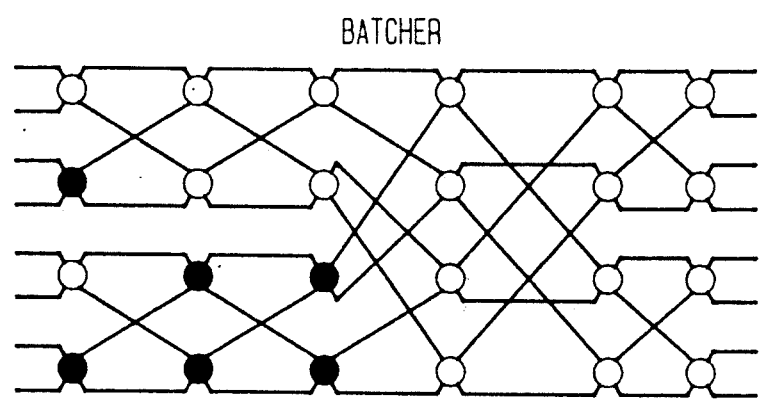

FIGS. 4a and 4b show the basic 8×8 (i.e. $\sqrt{N} \times \sqrt{N}$) banyan and Batcher chip designs, respectively. Each cell in the chip of FIG. 4a is formed using the cell of FIG. 3a. Similarly, each cell in the chip of FIG. 4b is formed using the cell of FIG. 2a.

The entire Batcher-banyan network 10 of FIG. 1 can be implemented using only the chip designs of FIGS. 4a and 4b. In particular, as is shown below, the entire Batcher network 12 can be implemented using only the chip design of FIG. 4b and the entire banyan network 14 can be implemented using the chip design of FIG. 4a.

Figure 5A:
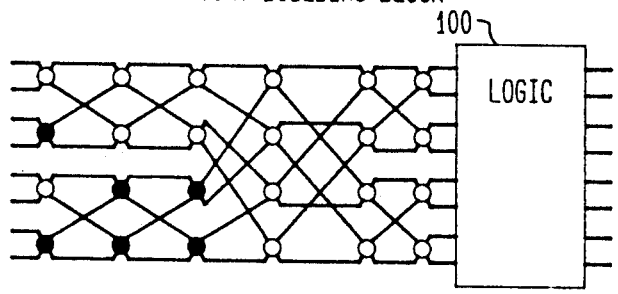
FIGS. 5a, 5b, 5c and 5d show the building block of FIG. 4b with perfect shuffle inputs obtained by disabling certain cells in the building blocks.

Turning to FIG. 5a the basic 8×8 Batcher building block of FIG. 4b is illustrated again. In FIG. 5a, a logic block 100 is connected at the outputs of the Batcher building block. The logic 100 contains no active components. The block 100 serves only to indicate the fact that in certain situations to be discussed below it will be necessary to rearrange the order of the outputs of the last column cells so that for example the top output of the topmost cell comes out at the bottom of the building block chip.

FIG. 5a, assume the logic 100 connects inputs to like numbered outputs. As indicated above, each of the cells comprising the building block of FIG. 5a can be disabled to the pass state using an ENABLE lead. The subnetwork of FIG. 5b can be derived from the network of FIG. 5a by disabling the cells in the first three columns of the subnetwork of FIG. 5a to the pass state. The subnetwork of FIG. 5c is created by disabling the first four columns of cells of FIG. 5a. Disabling the fifth column of cells in FIG. 5a creates the subnetwork of FIG. 5(d). The building block of FIG. 5a is known as the $8 \times 8$ Batcher or sort subnetwork. The building block of FIGS. 5b, 5c and 5d are known as the $8 \times 8$ merge subnetwork, the $4 \times 4$ merge subnetwork and $2 \times 2$ merge subnetwork, respectively.

Figure 5B:
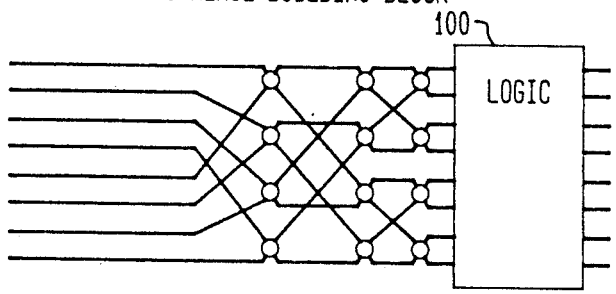
Figure 5C:
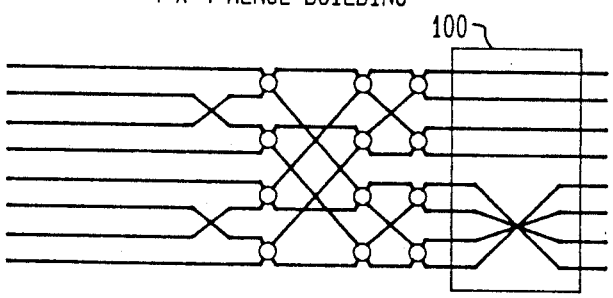
Figure 5D:
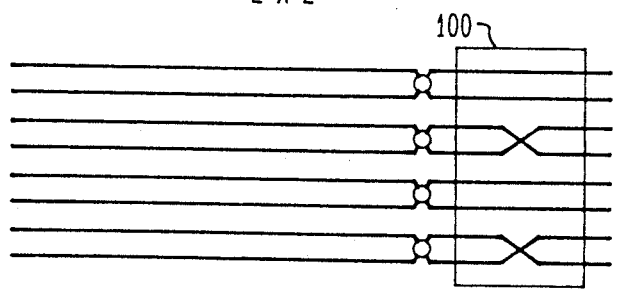

The banyan network of FIG. 4a is the same topology as the Batcher merge network of FIG. 5b. The banyan cell of FIG. 3a has the same enable feature as the Batcher cell of FIG. 2a. Therefore, by analogy with FIGS. 5b through 5d disabling the lead column of the $8 \times 8$ banyan creates two $4 \times 4$ banyan subnetworks, and disabling the second column creates four $2 \times 2$ banyan subnetworks. Thus any smaller Batcher or banyan subnetworks can be built from a larger chip.

It is interesting to note that an alternative way to make these subnetworks exists. For example, trying the enable leads of the first column and the last three columns of the subnetwork of FIG. 5(a) to a chip pin connected to a logical low makes the subnetwork FIG. 5c.

It will be seen that the $8 \times 8$ sort building block (i.e. the network of FIG. 5a) and the $8 \times 8$ merge building block (i.e. the network of FIG. 5b) will be needed with two configurations of logic 100: one with each input to the logic 100 connected to the correspondingly numbered output and one which reverses the output order. For the circuits of FIGS. 5c and 5d some inputs to logic 100 are connected to the same numbered outputs and some are not. Note that merge building blocks of FIGS. 5b, 5c and 5d have perfect shuffle input interconnection wiring.

The purpose of the remaining discussion herein is to show how the building block of FIG. 4b can be used to form the Batcher network 12 of FIG. 1 and to show how the building block of FIG. 4a can be used to form the banyan network 14 of FIG. 1. Note in connection with the formation of the Batcher network 12 the building block of FIG. 4a and the subnetwork of FIGS. 5b, 5c and 5d all of which are formed by disabling certain cells in the building block of FIG. 4a are utilized.

H. THREE DIMENSIONAL IMPLEMENTATION OF THE BATCHER-BANYAN NETWORK USING THE CHIP BUILDING BLOCKS

Before discussing the detailed interconnection of the building blocks of FIGS. 4 and 5 to form the Batcher-banyan network in three dimensions, it may be helpful to look at the completed three dimensional Batcher-banyan network. This version of the Batcher-banyan network 10 is shown in FIG. 24. As shown in FIG. 24, the Batcher-banyan network 10 is formed from adjacent horizontal and vertical stacks of building block chips. This minimizes the lengths of the interconnection leads and thus minimizes the signal propagation delays.

The $N \times N$ banyan network 14 is discussed first. The banyan network 14 of FIG. 24 comprises a first stage 202 which is formed from a stack of vertically oriented $\sqrt{N} \times \sqrt{N}$ banyan subnetworks of type shown in FIG. 4(a) and a second stage 204 which is formed from a stack 204 of horizontally oriented $\sqrt{N} \times \sqrt{N}$ banyan subnetworks of the type shown in FIG. 4(a). In this discussion for illustrative purposes $N = 64$.

The Batcher network 12 of FIG. 24 comprises seven stages 190 ... 196. The stage 190 is a stack of horizontally oriented Batcher building blocks of the type shown in FIG. 4(b). The stages 192, 194, and 196 each comprise stacks of horizontally oriented $8 \times 8$ merge subnetworks of the type shown in FIG. 5(b). The stage 191 is a stack of vertically oriented $2 \times 2$ merge building blocks of the type shown in FIG. 5(d). The stage 193 is a stack of vertically oriented $4 \times 4$ merge building blocks of the type shown in FIG. 5(c). The stage 195 is a stack of vertically oriented $8 \times 8$ merge building blocks of the type shown in FIG. 5(b).

Thus, the Batcher network 12 comprises an input stage comprising horizontally oriented Batcher subnetworks. The Batcher network 12 also comprises a plurality of horizontal stacks comprising merge subnetworks of fixed order (i.e. stacks 192, 194, 196 which comprise $8 \times 8$ merge subnetworks) and a plurality of vertical stacks which comprise merge subnetworks of increasing order (i.e. stacks 191, 193, 195 which comprise $2 \times 2$, $4 \times 4$, and $8 \times 8$ subnetworks respectively).

I. INTERCONNECTION OF THE BUILDING BLOCK CHIPS TO FORM A BATCHER-BANYAN NETWORK IN THREE DIMENSIONS

The discussion below relating to FIGS. 6–24 shows how the building blocks of FIGS. 4 and 5 are interconnected to form the Batcher-banyan network of FIG. 24. An alternative method of interconnection is presented below in connection with FIGS. 25–28.

Figure 6:
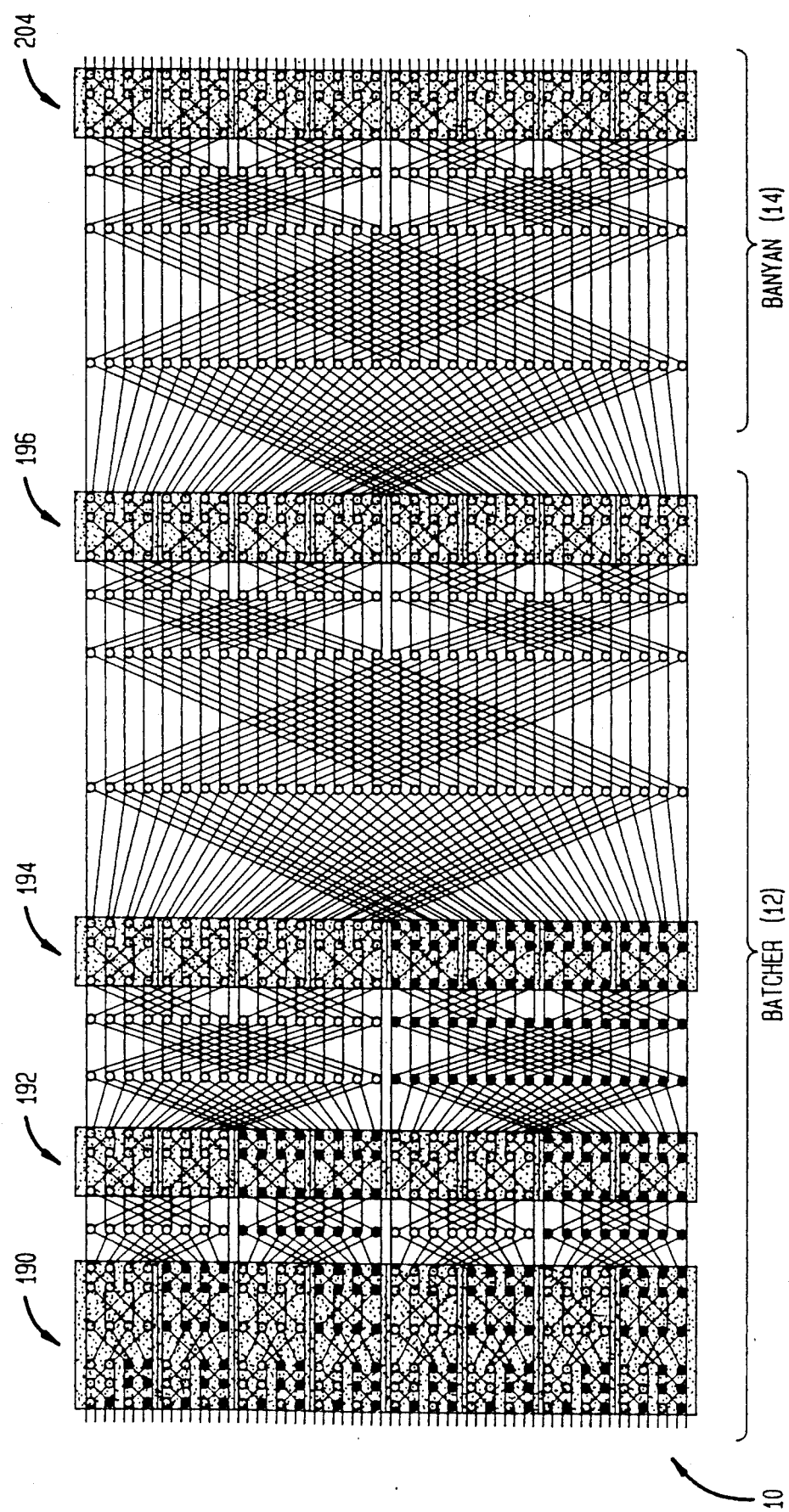

In FIG. 6, the network 10 of FIG. 1 is illustrated again. In FIG. 6, shaded areas identify groups of cells of FIG. 1 to be assigned to $8 \times 8$ Batcher building blocks of the type shown in FIGS. 4b and 5b (shaded area 190), $8 \times 8$ banyan building blocks of the type shown in FIG. 4a (shaded area 204), and $8 \times 8$ merge building blocks of the type shown in FIG. 5b (shaded area 192, 194, 196). The shaded areas 190, 192, 194, 196 and 204 of FIG. 6 becomes the stages 190, 192, 194, 196 and 204 of FIG. 24. Within each shaded area four rows of cells are assigned to each building block sequentially from the top. In FIG. 7, each group of assigned cells of FIG. 6 is replaced with a box representing the building block. The number assigned to the box represents the initial order of building block within its shaded area. Except in the stage 190, the direction of the arrow indicates the type of cells inside the building block. A down arrow means all cells sort down (white cells). An up arrow means all cells sort up (black cells). Note that the perfect shuffle input wiring pattern inside the merge building blocks has forced a change of input wiring to the boxes from a binary pattern to an inverse (or reversed) perfect shuffle.

Figure 8:
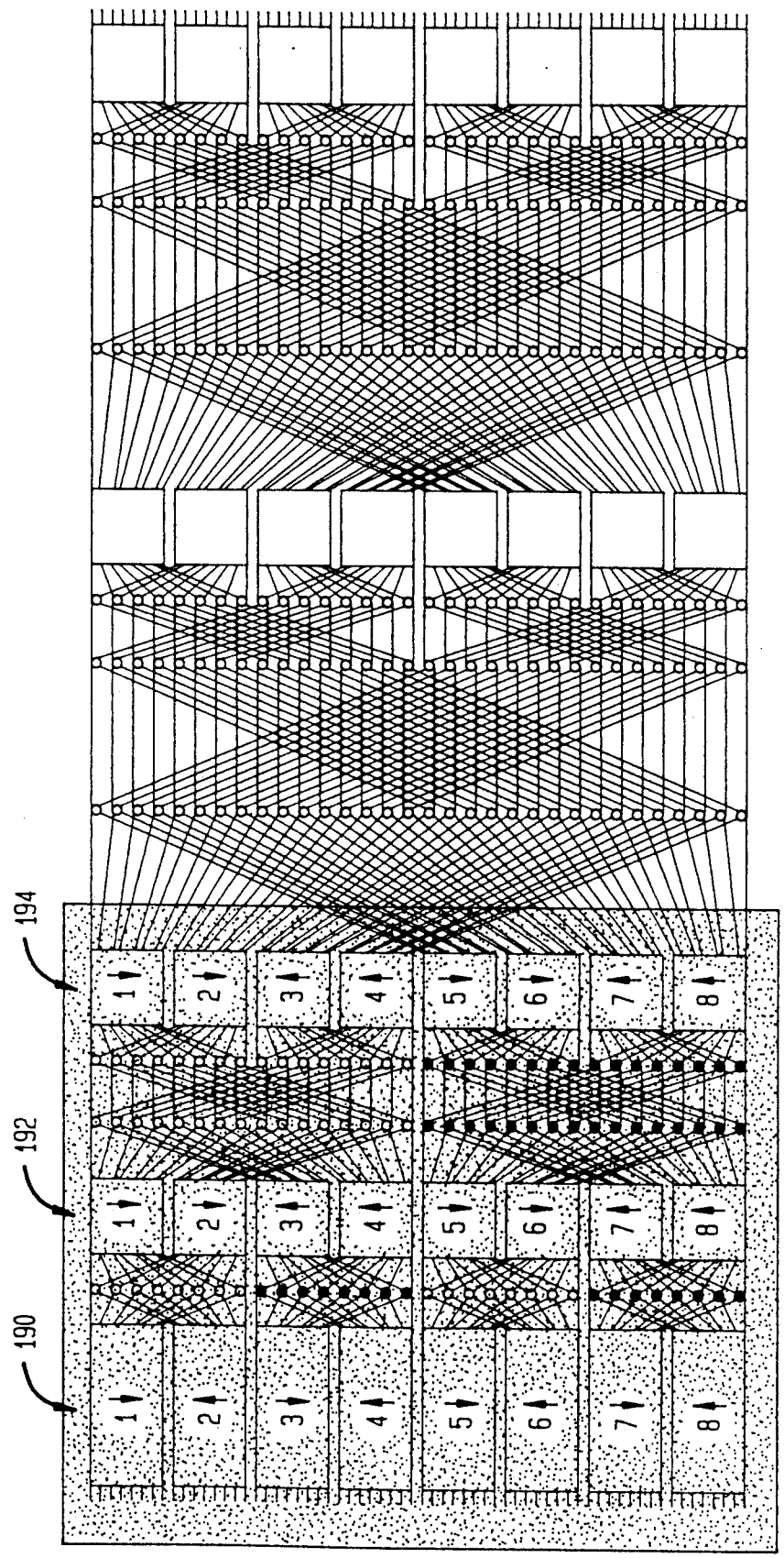
Figure 9:
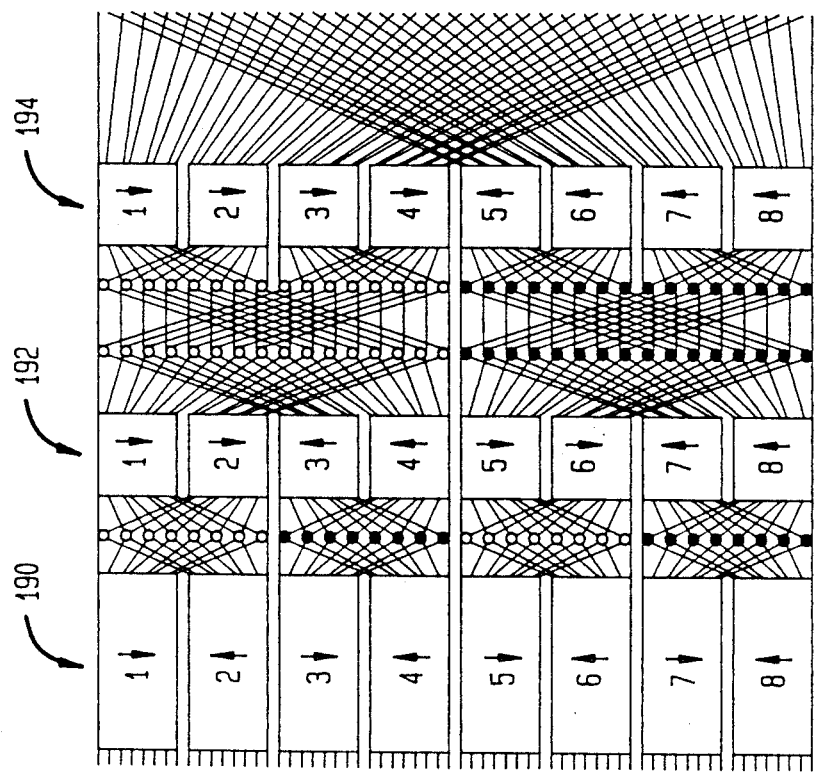
Figure 10:
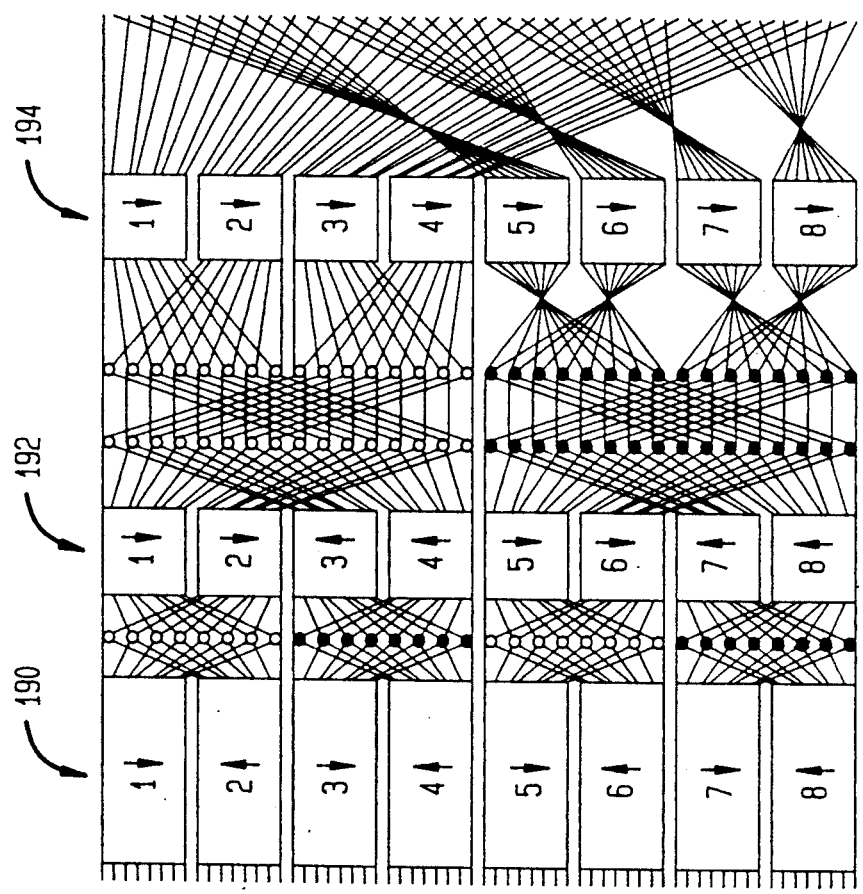

FIG. 8 repeats the Batcher-banyan network as shown in FIG. 7. The shaded area of FIG. 8 is isolated in FIG. 9 for further rearrangement. The objective is to convert all cells which sort up (black cells) to cells which sort down (white cells). Turning over boxes 5, 6, 7, and 8 of the rightmost column in FIG. 9 (i.e. column 194) results in FIG. 10. All cells inside these boxes now sort down, i.e. they have become white cells (represented by the down arrow in each box).

Figure 11:
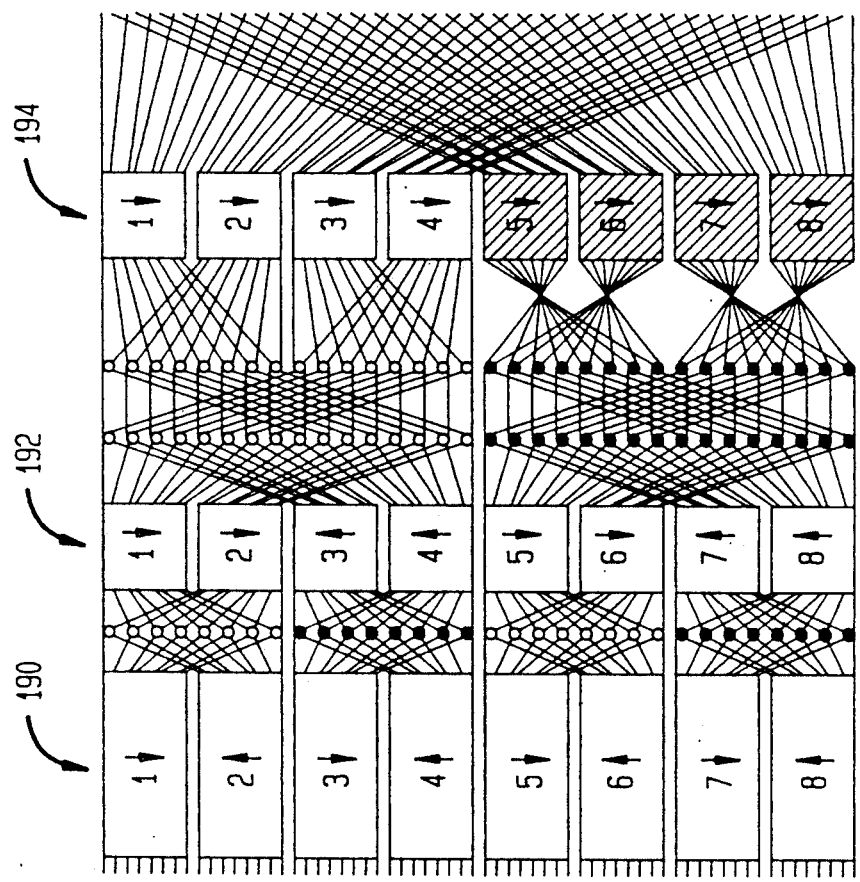

In FIG. 11, accommodate the reversed output leads of these boxes by reversing the order of output leads inside the building block (represented by shading each box) through use of the logic 100 of FIG. 5. Now all boxes of the rightmost column can be realized using the 8×8 merge building block of FIG. 4b with the output leads reversed where necessary.

Figure 12:
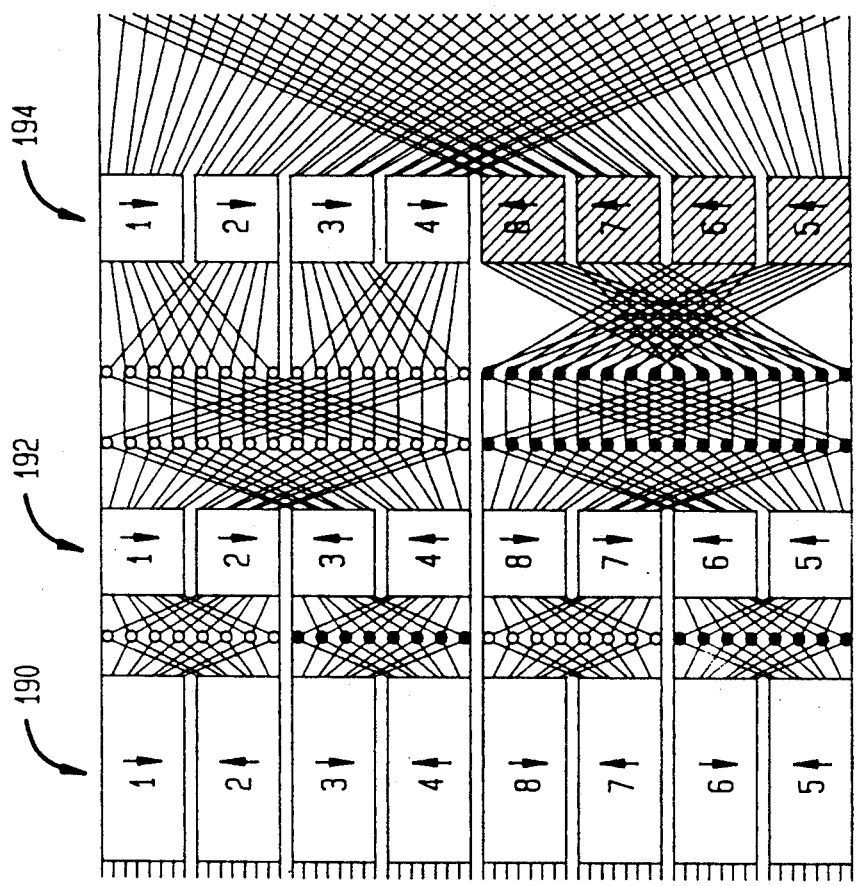
Figure 13:
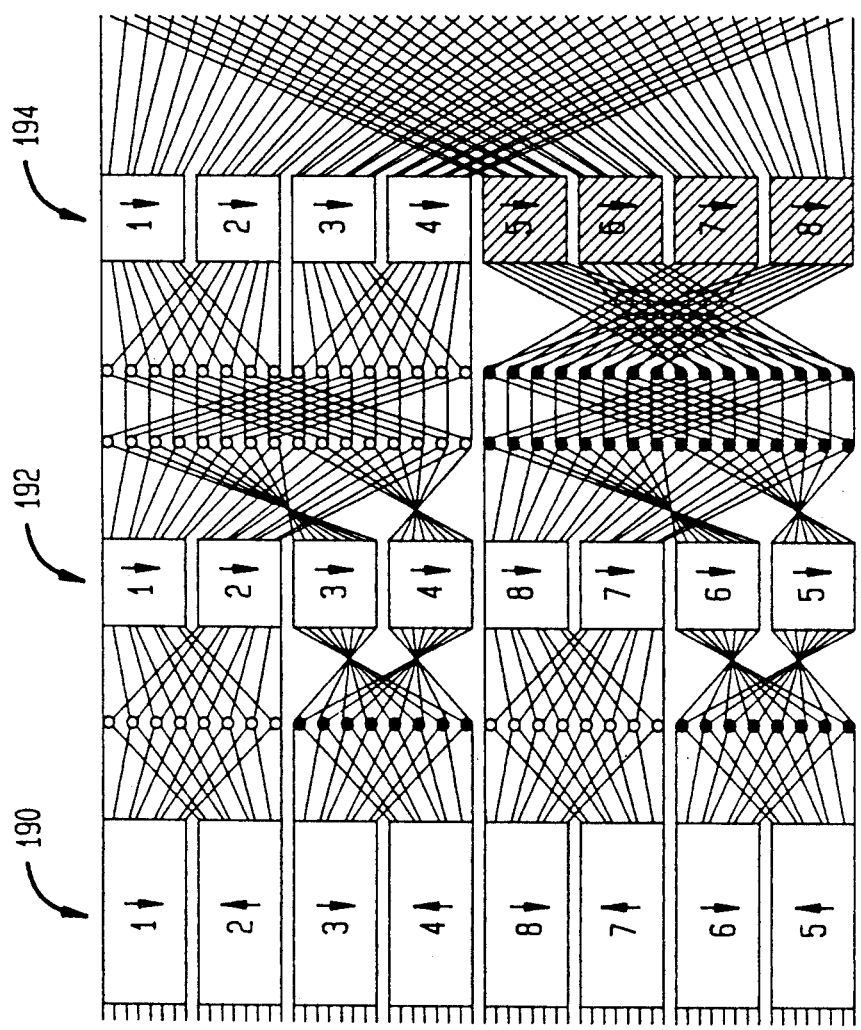
Figure 14:
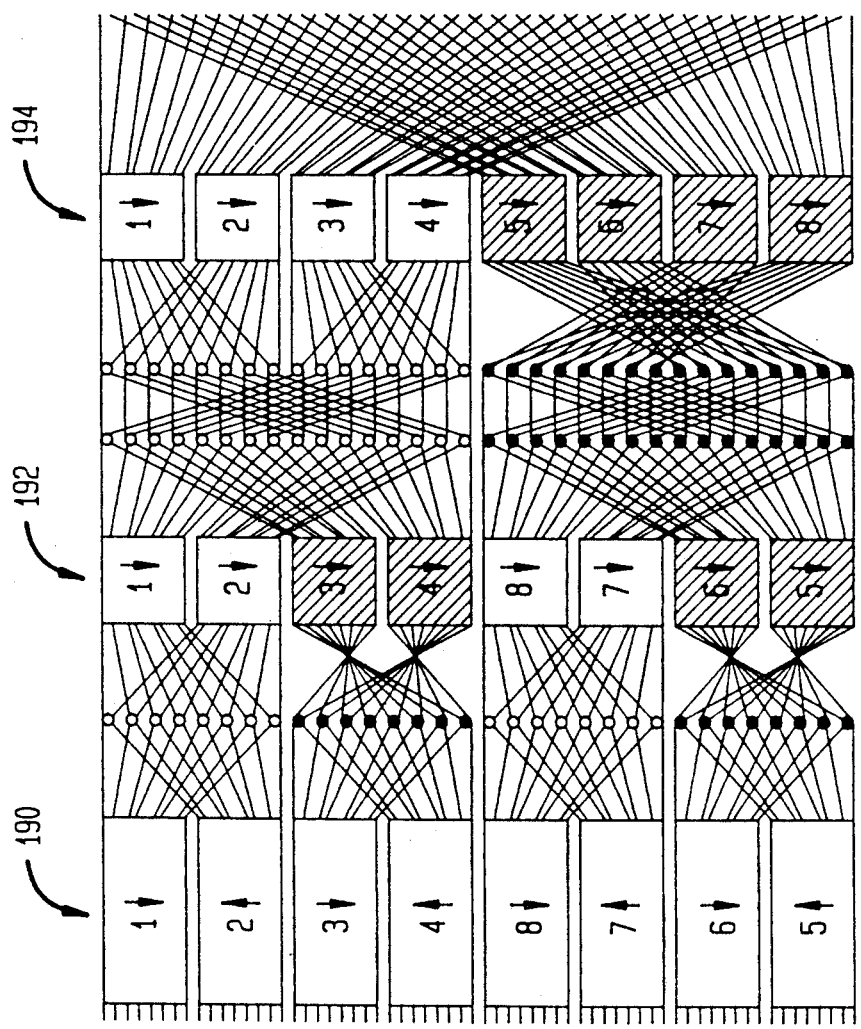

Next, address the two columns of black cells immediately to the left of the shaded boxes in FIG. 11. Imagine they are interconnected with the shaded boxes by elastic wires. Turn over, as a unit, the two columns together with all boxes and cells to the left. The result is shown in FIG. 12. Note the reversal of the order of unshaded boxes 5-8 within the column labeled 182 in FIG. 12.

Figure 15:
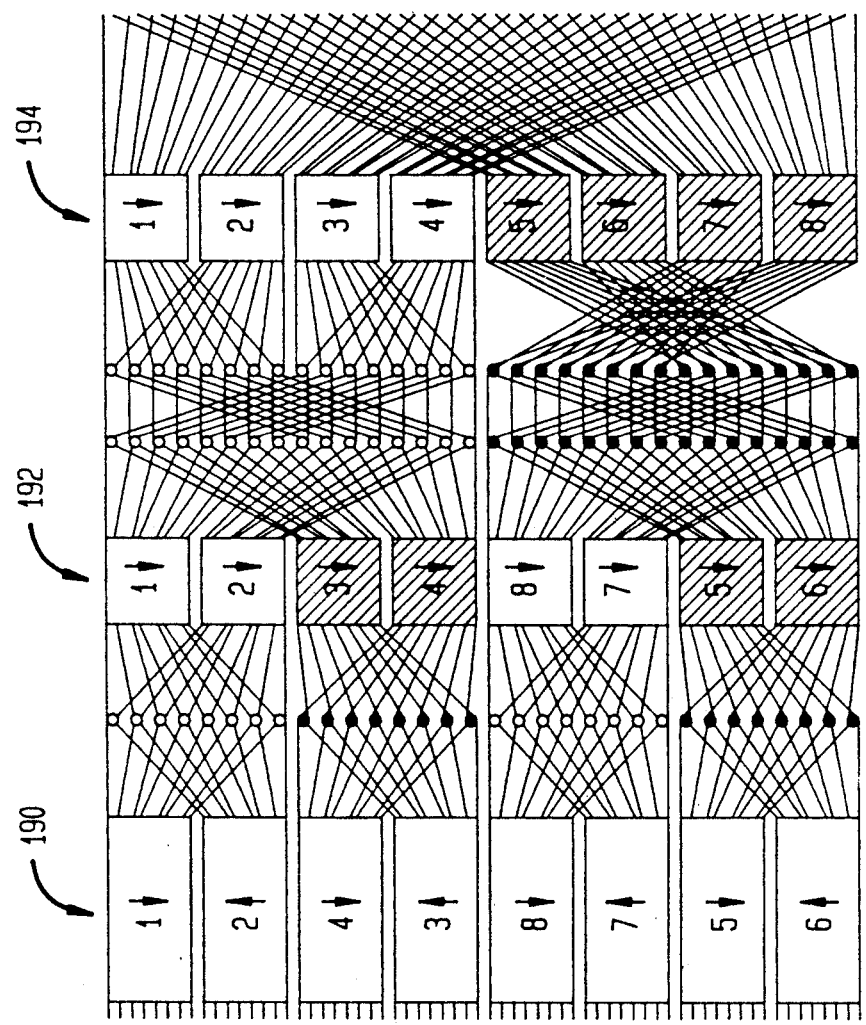
Figure 16:
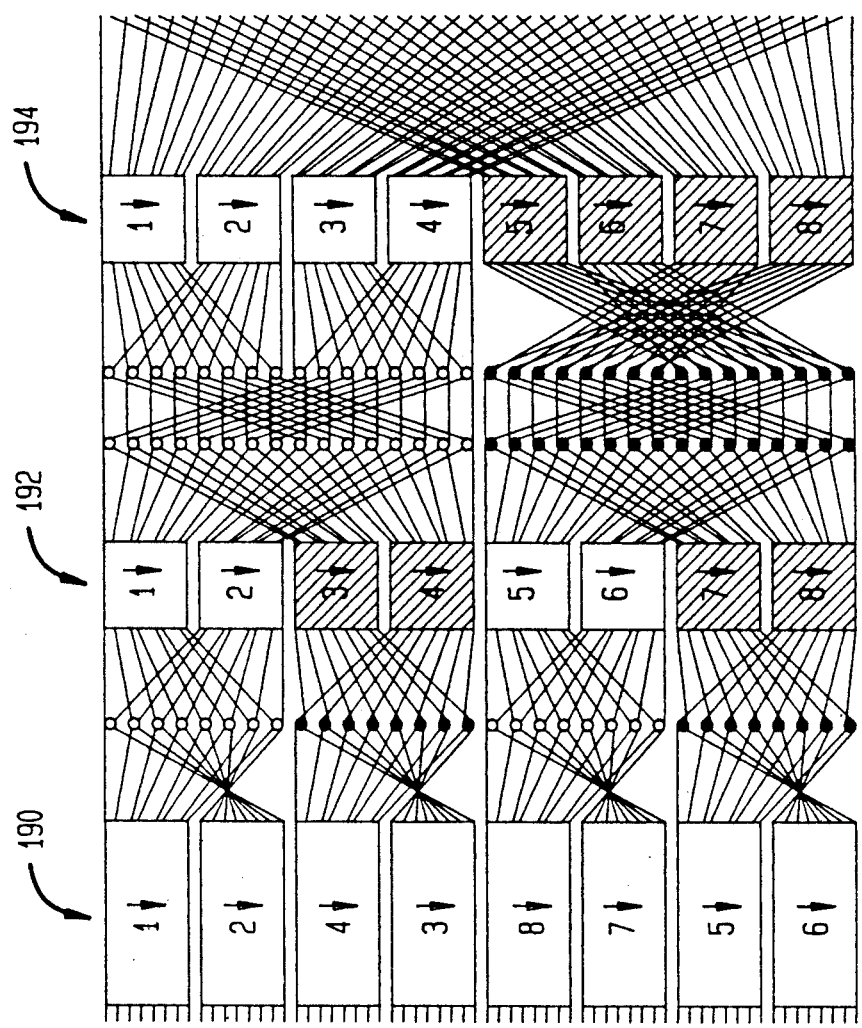

The foregoing procedure will now be repeated to change cells which sort up to cells sorting down within boxes 3, 4, 5, and 6 of the column 192.
1. Turn over the boxes (FIG. 13).
2. Replace the resulting reversal of each box's output leads with a reversal within the box, shading the box (FIG. 14).
3. Turn over, as a unit, the column of black cells together with all boxes to the left (FIG. 15). Note the reversal of the order of unshaded boxes 3, 4, 5, and 6 in the leftmost column.

Figure 17:
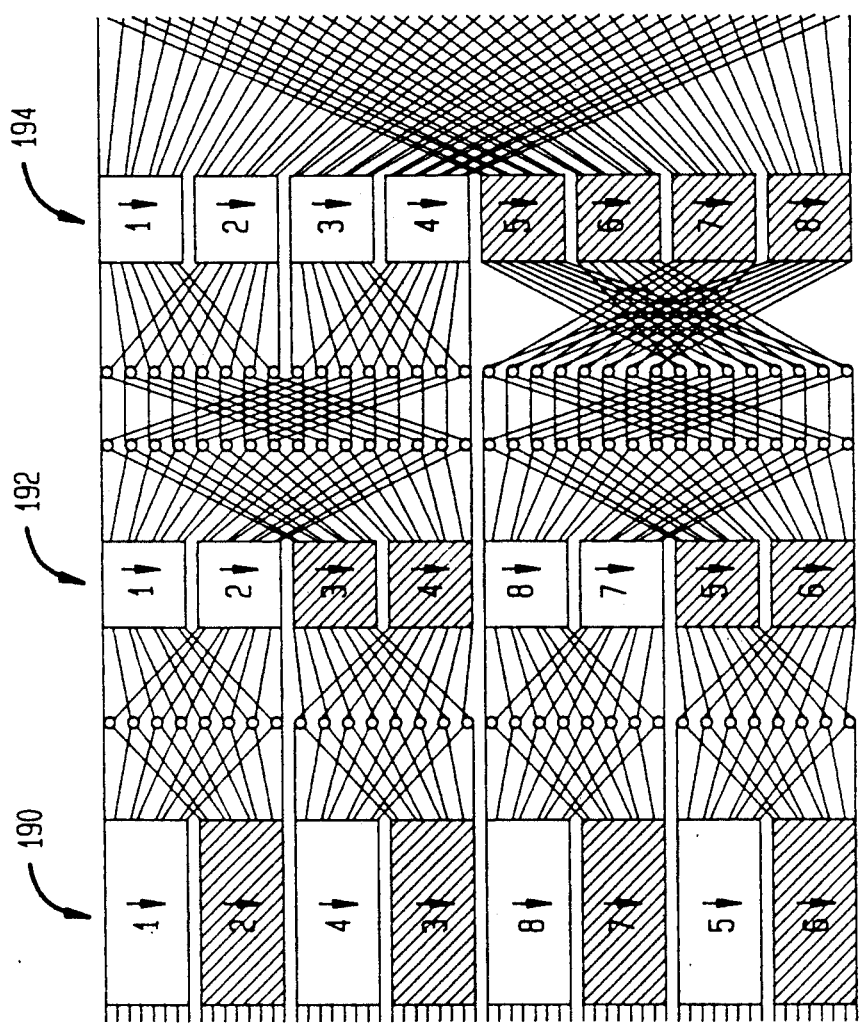

Finally, repeat the procedure in order to change the cells within boxes 2, 3, 6, and 7 of column 190 to sort down. Turn over the boxes (FIG. 16), and incorporate the reversal of outputs within the building block, shading each box (FIG. 17). At this point all boxes in the middle column (i.e. column) can be realized with the building block of FIG. 5(b) and those off the left column with that of FIG. 5(a). This explains the formation of the stages 190, 192, 194, 196. Now, the formation of the stages 191, 193 and 195 is considered (see FIG. 24).

Figure 18:
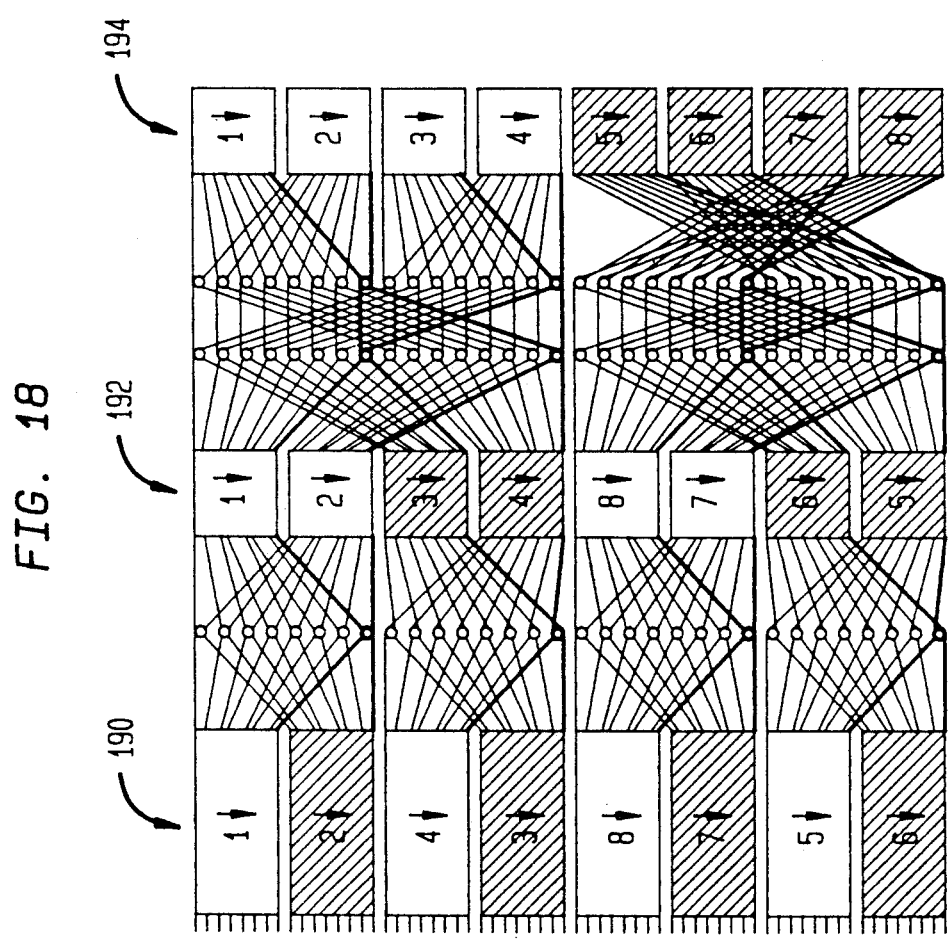
Figure 19:
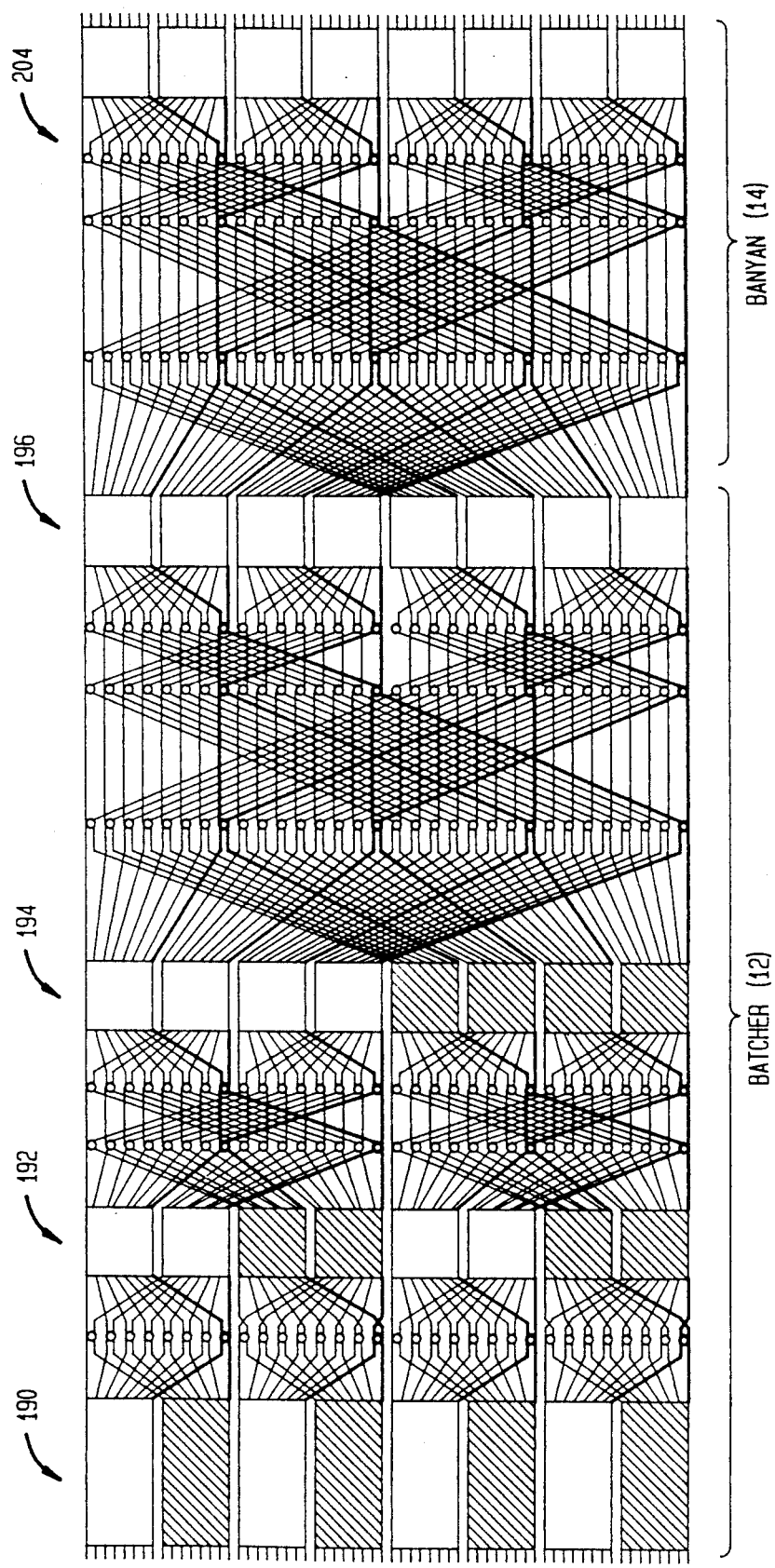

In FIG. 18 the wires connecting to every eighth cell of each column are highlighted. It is evident that every wire terminates on input or output 8 of a building block. Furthermore, in general every eighth cell starting with the ith cell terminates on input or output i, $1 \leq i \leq 8$. FIG. 19 shows the result to be true for the whole Batcher-banyan network. The cells of the 4×4 merge building blocks are rearranged in the lower half of the column (193) to emphasize that they are as shown in FIG. 5(c).

Figure 20:
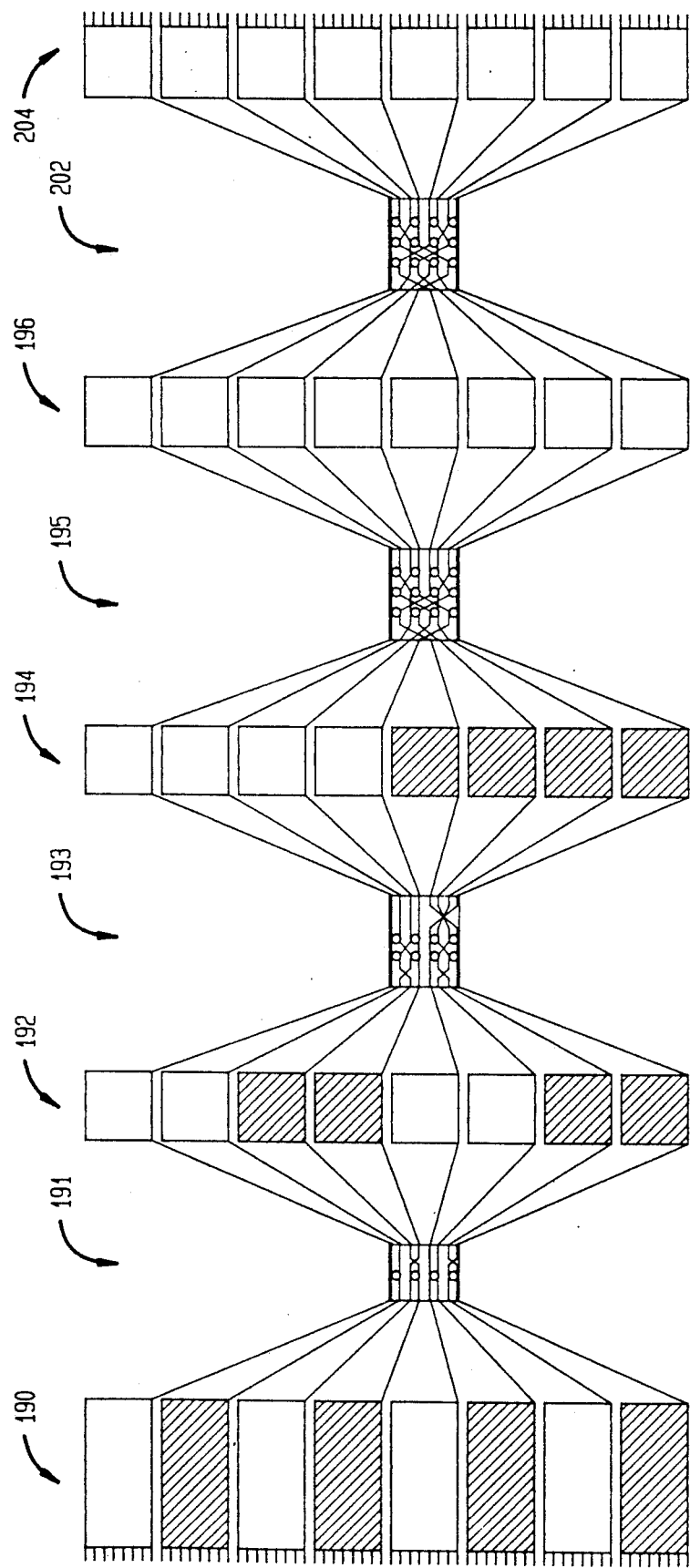
Figure 21:
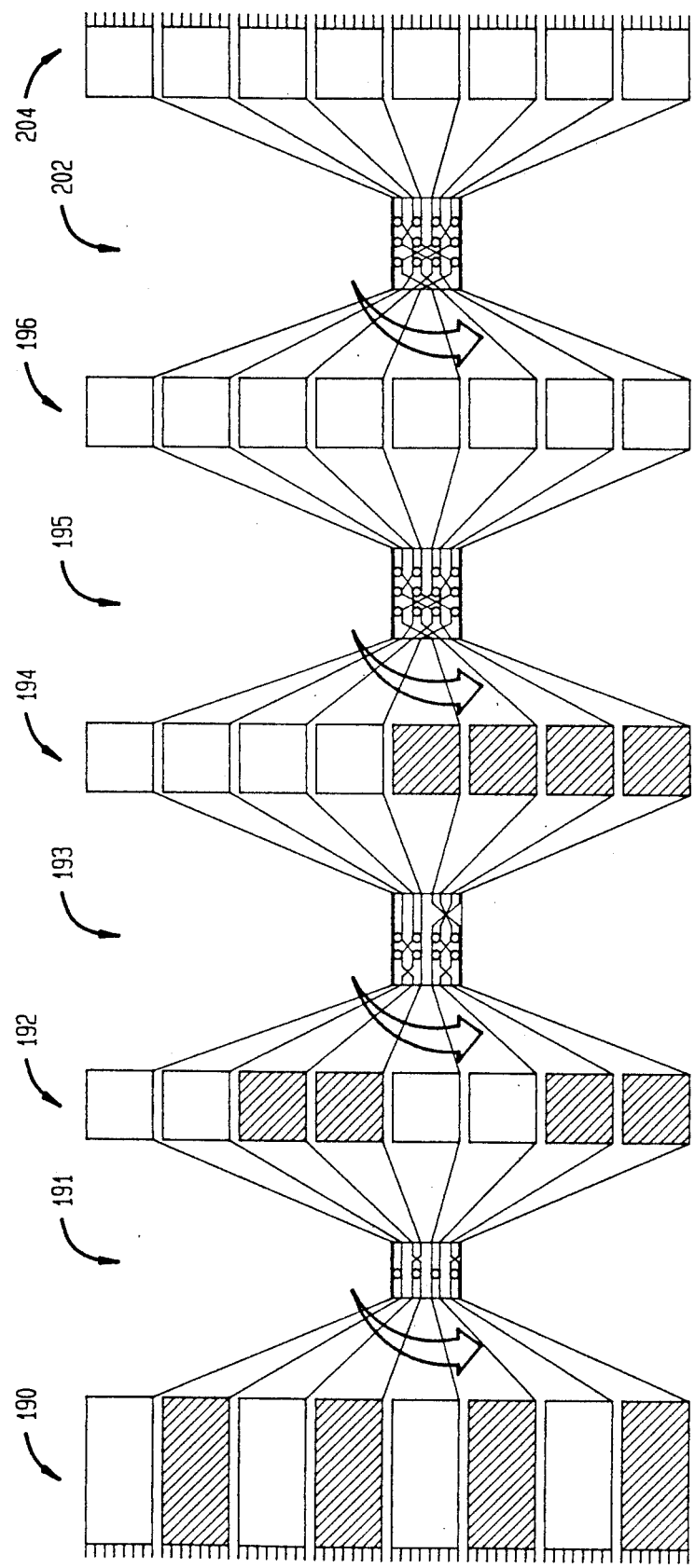
Figure 22:
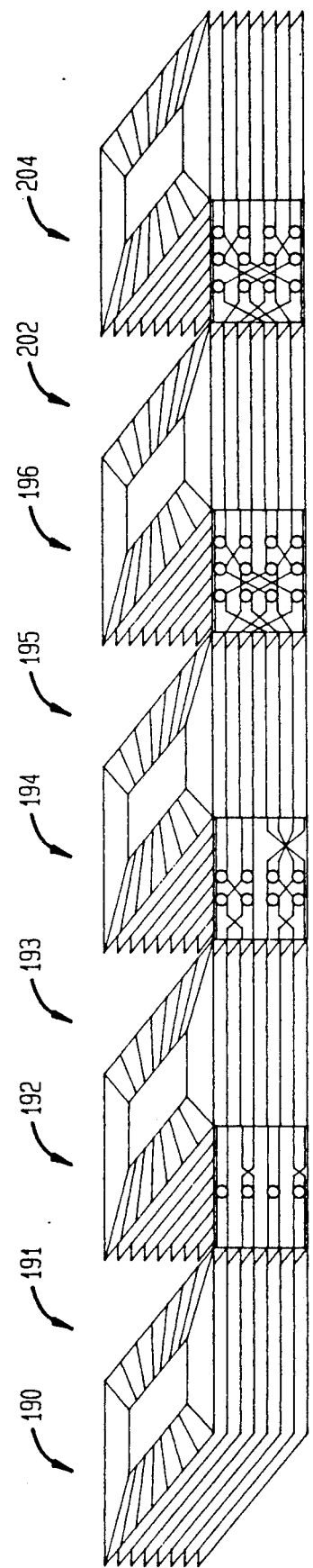
Figure 23:
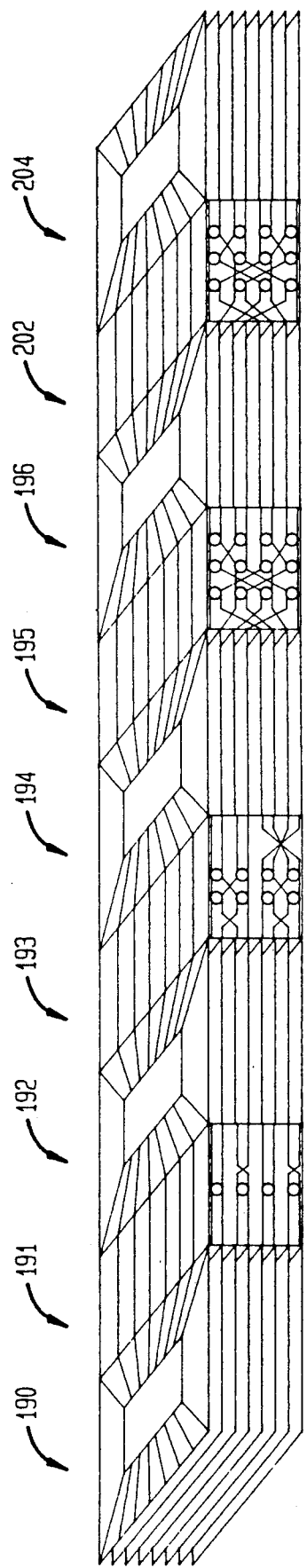

Eliminate all cells except every 8th and all wires not connected to every 8th cell, grouping cells to clearly identify the building blocks of FIG. 5 (FIG. 20). Stand the indicated building blocks 191, 193, 195, 202 on edge and stack the building blocks within columns 190, 192, 194, 196, 204 in top-to-bottom order with the top building block on top (FIGS. 21 and 22). Choosing i such that $1 \leq i \leq 8$ yields a similar result: a building block connecting only to input and output pins i meaning it would stand in position i instead of position 8. FIG. 23 depicts the full three-dimensional configuration. FIG. 24 shows the final step of replacing groups of cells with chips, each of which has a simple fan-in of inputs and fan-out of outputs. Each wire connects at the card edge to the wire on the adjacent orthogonal card.

The line of reasoning just completed involved only rearrangement of cells. Through each step, each interconnecting wire remained connected to the same input and output pins, but the position of some cells within some columns was changing. There is another way of achieving the same result which involves some disconnection and reconnection of one end of some wires.

Figure 25A:
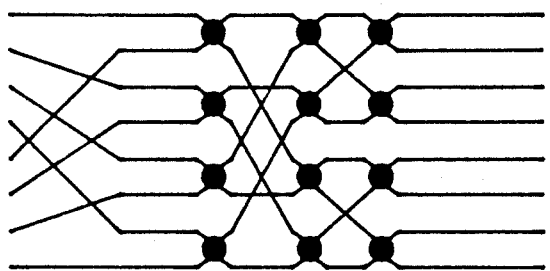
FIGS. 25-28 show an alternate way of building the entire Batcher-banyan network of FIG. 1 from the two building blocks of FIGS. 4a and 4b.
Figure 25B:
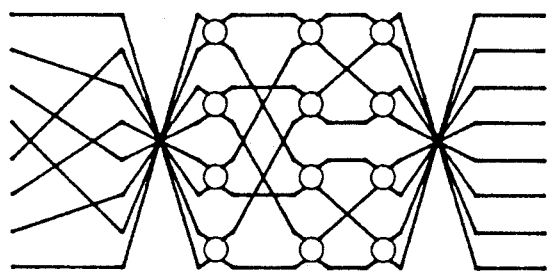
Figure 25C:
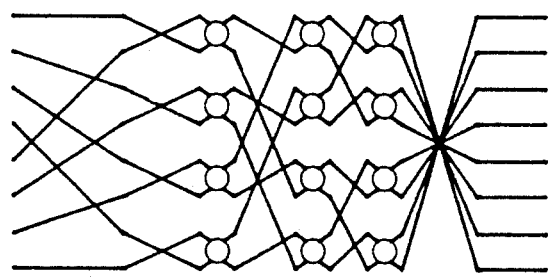
Figure 25D:
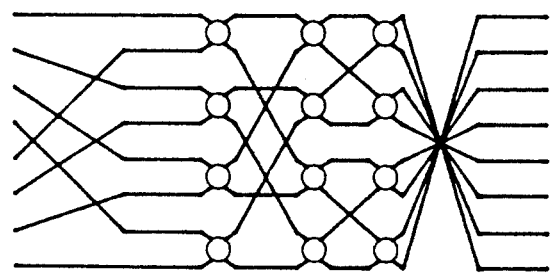
Figure 26A:
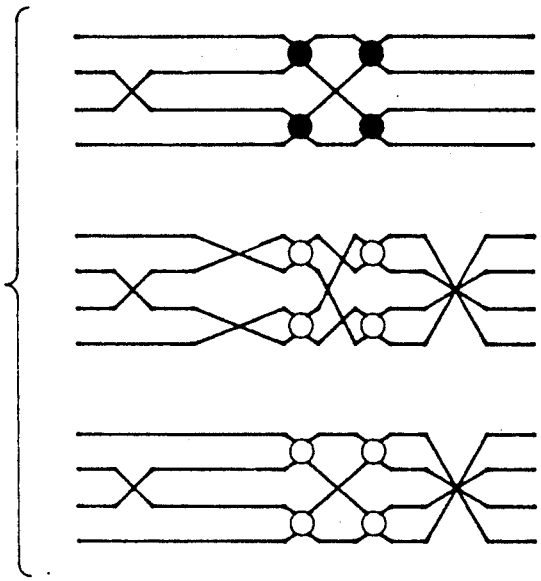
Figure 26B:
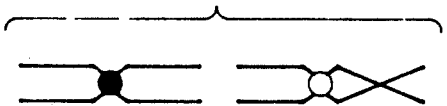

With FIG. 25 it can be shown that an 8×8 merge building block with cells sorting up (see FIG. 25(a)) is equivalent to an 8×8 merge building block with cell sorting down and output leads reversed (FIG. 25(d)). First turn the group of cells over as a unit (FIG. 25(b)) keeping the input and output lead positions constant. Then rearrange the cells as shown in FIG. 25(c). Interchanging inputs of a cell does not change the resultant outputs of the cell, so reverse the input connections to every cell (FIG. 25d). FIG. 26(a) and FIG. 26(b) shows the same result to be true for the 4×4 and 2×2 building blocks.

Figure 27:
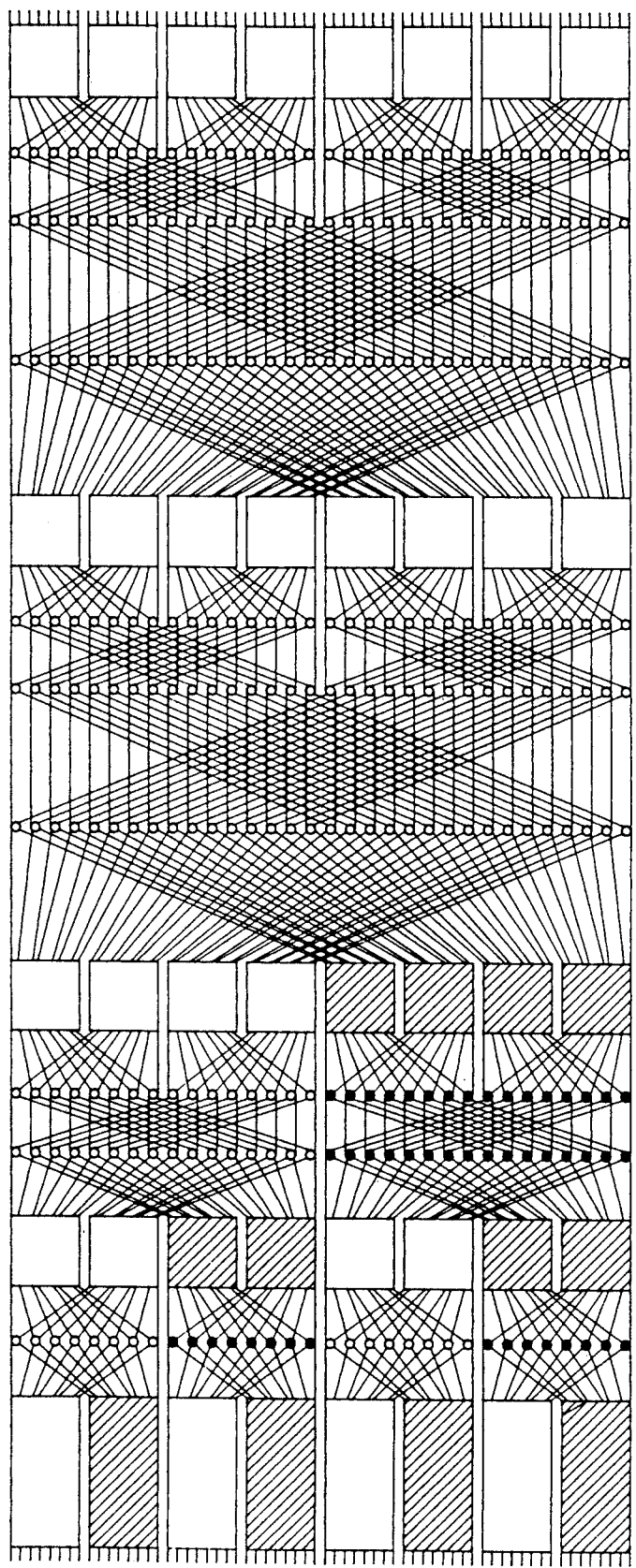
Figure 28:
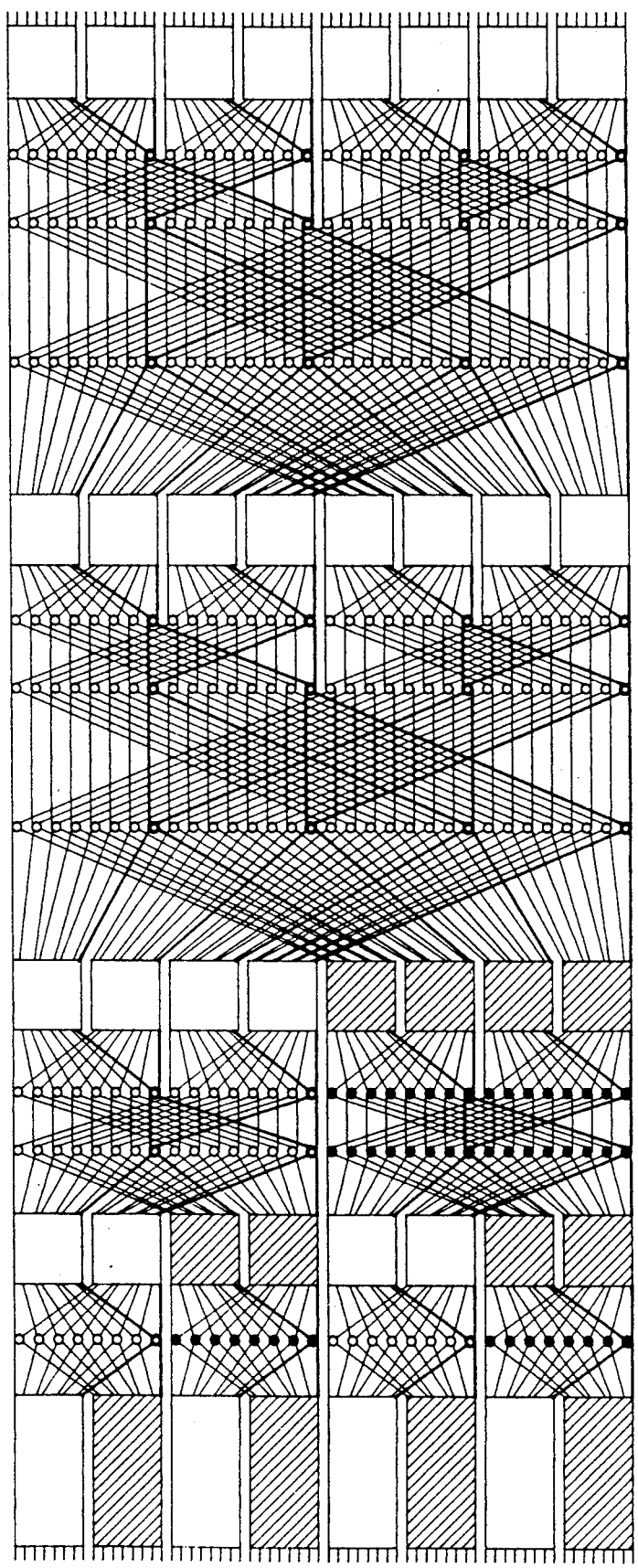

Given the equivalence in FIGS. 25 and 26, the building blocks of FIG. 5a and 5b can be used in FIG. 6 to achieve the configuration of FIG. 27 directly. In FIG. 28, in every column of cells, every 8th cell and each cell's associated wires are highlighted, as was done in FIG. 19. Again using the equivalence in FIGS. 25 and 26, the building blocks of FIG. 5b, 5c, and 5d achieve the configuration of FIG. 20 directly. The results shown in FIGS. 21-24 then follow.

CONCLUSION

A switching cell for use in a packet switching network such as a banyan network has been disclosed. Finally, the above-described embodiments of the invention are intended to be illustrative only. Numerous alternative embodiments may be devised by those skilled in the art without departing from the spirit and scope of the following claims.

What is claimed is:

1. A packet switching cell for use in a packet switching network comprising:
    an input for receiving a packet including a destination address,
    first and second outputs, selector means for connecting said input with said first output or said second output depending on whether a specific bit occupying a predetermined position in said address is a logic "1" or a logic "0", and
    means for removing said specific bit from said address, eliminating the empty position left by said removed bit and reinserting said specific bit elsewhere in said packet.

2. The switching cell of claim 1 wherein said switching cell further comprises disabling means responsive to a disabling signal for causing said input to be connected to said first output or said second output independent of the value of said specific bit.

3. The cell of claim 1 wherein said predetermined position in said address is the first position after a start of said packet and wherein said specific bit is reinserted as the last bit of said address.

4. A switching cell for use in a packet switching network comprising
    first and second inputs for receiving first and second packets including first and second destination addresses, respectively,
    first and second outputs,
    selector means for connecting in a pass state the first input with the first output and the second input with the second output and for connecting in a cross state the first input with the second output and the second input with the first output depending on the logic values of specific bits occupying predetermined positions in said first and second addresses of said first and second packets, and disabling means for causing said selector means to be in one of said states independent of said logic values of said specific bits.

5. The switching cell of claim 4 wherein said cell further includes means for removing said specific bits from said addresses, eliminating the empty positions left by the removed bits, and reinserting said specific bits elsewhere in said packets.

6. The switching cell of claim 4 wherein said selector means destroys both said first and second packets if said logic values of said specific bits are the same.

7. A packet switching network comprising
a first stack of subnetworks,
a second stack of subnetworks oriented perpendicular to and connected to said first stack of subnetworks, each of said subnetworks comprising an array of cells,
each of said cells comprising at least one input for receiving a packet including a destination address, first and second outputs, selector means for connecting said input with said first output or with said second output depending on a logic value of a specific bit in said address, and disabling means responsive to a disabling signal for causing said input to be connected to said first output or said second output independent of said logic value.

8. The packet switching network of claim 7 wherein said specific bit is the first bit after a start bit of said packet and wherein each of said cells includes means for rotating said specific bit to the end of said address.

9. The packet switching network of claim 7
wherein at least some of said cells comprise first and second inputs for receiving first and second packets having first and second destination addresses, and
wherein said selector means connects in a pass state said first input with said first output and said second input with said second output and connects in a cross state said first input with said second output and said second input with said first output.

* * * * *